US006907269B2

(12) United States Patent
Yamaguchi et al.

(10) Patent No.: US 6,907,269 B2
(45) Date of Patent: Jun. 14, 2005

(54) MOBILE COMMUNICATION BASE STATION EQUIPMENT

(75) Inventors: Ryo Yamaguchi, Miura-gun (JP); Noriyoshi Terada, Yokosuka (JP); Toshio Nojima, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 801 days.

(21) Appl. No.: 09/968,511

(22) Filed: Oct. 2, 2001

(65) Prior Publication Data

US 2002/0039912 A1 Apr. 4, 2002

(30) Foreign Application Priority Data

Oct. 2, 2000 (JP) ....................................... 2000-301895
Oct. 2, 2000 (JP) ....................................... 2000-301896
Feb. 27, 2001 (JP) ....................................... 2001-052659

(51) Int. Cl.[7] ................................................ H04M 1/00

(52) U.S. Cl. .................... 455/561; 455/562.1; 343/853; 342/147; 342/148; 342/157; 342/158

(58) Field of Search ........................ 455/13.3, 25, 63.4, 455/561, 562.1; 342/82, 147, 148, 157, 158; 343/853

(56) References Cited

U.S. PATENT DOCUMENTS 4,317,229 A 2/1982 Craig et al.
5,596,333 A 1/1997 Bruckert
5,684,491 A 11/1997 Newman et al.
6,188,913 B1 2/2001 Fukugawa et al.

FOREIGN PATENT DOCUMENTS

| | | |
|---|---|---|
| DE | 197 37 136 | 3/1998 |
| EP | 0 932 218 | 7/1999 |
| JP | 9-284200 | 10/1997 |
| WO | WO 95/09490 | 4/1995 |
| WO | WO 96/07108 | 3/1996 |
| WO | WO 98/42150 | 9/1998 |
| WO | WO 99/52311 | 10/1999 |

*Primary Examiner*—William Trost
*Assistant Examiner*—James D Ewart
(74) *Attorney, Agent, or Firm*—Oblon, Spivak, McClelland, Maier & Neustadt, P.C.

(57) ABSTRACT

A mobile communication base station determines the oncoming direction of a radio wave with a simple arrangement and transmits a narrow angle beam in this direction. Received signals from a pair of wide angle beam antennae 21-1 and 21-2 having an equal configuration and a common orientation and which are located close to each other are fed to a direction finder receiver 22 and a communication receiver 15. By utilizing the fact that the both received signals have a coincident amplitude, a phase difference between the received signals is detected. The oncoming direction of the received radio wave (or the direction of a mobile station) is determined on the basis of the phase difference. A beam switcher 12 is controlled so as to connect a transmitter 13 to a narrow angle beam antenna (one of 11-1 to 11-4) which is directed in the oncoming direction thus determined.

17 Claims, 27 Drawing Sheets

MOBILE COMMUNICATION BASE STATION EQUIPMENT

BACKGROUND OF THE INVENTION

The present invention relates to a base station equipment of a mobile communication system which is intended to enable a communication with a mobile station with a narrow angle directivity (narrow angle beam) antenna in order to reduce the quantity of interferences.

An adaptive array antenna in a conventional mobile communication base station equipment is constructed by providing a plurality of receivers for each communication channel, adjusting an antenna weight to control the direction of a principal beam in the antenna directivity response, extracting an optimal received signal, and employing the antenna weight which is used for the optimal signal in controlling the direction of a principal beam in the directivity response of a transmitting antenna. However, this practice requires a plurality of transmitters/receivers for each channel for both the transmission and the reception, disadvantageously increasing the scale of the equipment.

To accommodate for this problem, there is proposed a technique as illustrated in FIG. 1 where a beam switcher 12 selectively connects a transmitter 13 to one of a plurality of antennas 11-1 to 11-4 having narrow beam angle directivities 35-1 to 35-4 in mutually different directions through respective duplexers 36-1 to 36-4 while a beam switcher 14 selectively connects a receiver 15 to one of the antennas, thus minimizing the number of transmission/reception network paths. According to this technique, receivers 16-1 to 16-4 are used to measure the signal strength from respective narrow beam antenna 11-1 to 11-4 to allow a beam selection control circuit 17 to switchably control the beam switchers 12, 14 so that transmitter 13 and the receiver 15 may be connected to one of the antennas having the maximum received signal power. With this technique, to scan the arriving direction of a received radiowave, a number of direction finder receivers 16-1 to 16-4 are necessary which is equal to the number of antenna branches, which is four in FIG. 1. When the technique is applied to the mobile communication, which represents a multi-path environment, a difficulty is encountered in establishing an accurate beam switching because of a variation in the signal strength which occurs independently on each antenna branch. (See Tadashi Matsumoto, Seiji Nishioka and David J. Hodder, "Beam-Selection Performance Analysis of a Switched Multibeam Antenna System in Mobile Communications Environments," IEEE Trans., VT, Vol. 46, No. 1 (February 1997).)

A high resolution signal processing technique such as MUSIC is known in the art to estimate the arriving direction of a radiowave (DOA; Direction of Arrival), but requires a complex treatment including the calculation of a correlation matrix, resulting in a tremendous length of time as the number of antennas increases. (See R. O. Schmidt, "Multiple Emitter Location and Signal Parameter Estimation," IEEE Trans. AP. Vol-34, No. 3 (March 1986).) The treatment of this technique is even more complicated when plural antenna having different directivities are used. For this reason, it necessitates the provision of an array antenna including antenna elements 18-1 to 18-4 having a common directivity for direction finding purpose, separately from communication antennas, as shown in FIG. 2. Received signals from the antenna elements 18-1 to 18-4 are fed to the receivers 16-1 to 16-4, outputs of which are processed in a circuit 19 according to the MUSIC procedure to determine the direction on which the transmitting mobile station is located, thus controlling the beam switchers 12 and 14.

In the actual operation of the mobile communication, there are users (mobile stations) who move rapidly during the communication intervals and who frequently change the channels on one hand, and there are many users who complete the communications without substantial movements on the other hand. Because the mobile communication base station equipment premises that every user (mobile station) be serviced during a rapid movement thereof, it uses antenna which exhibit a common wide angle directivity response for a plurality of frequency channels and time slots. Thus, when commencing a communication with a particular user (mobile station), the base station equipment is radiating radio waves in directions of its service area such as a sector area, for example, other than the direction on which the user is located, and this represents a wasteful power dissipation. It will thus be seen that the use of antennas which exhibit a common angle directivity response for every frequency channel and time slot is problematic from the standpoints of radio wave environment and power saving. There is then a proposal which uses an array antenna to produce a narrow beam angle directivity response separately for each frequency channel and time slot so that a narrow angle beam be always directed to a user, thus tracking it. The proposed technique is excellent when viewed from above standpoints, but presents problems in that an increased area must be provided for installation of antennas and the equipment must be scaled up. In addition, a complex signal processing system is needed.

A conventional arrangement of base station equipment is shown in FIG. 3. A receiving antenna 111 and a transmitting /receiving antenna 112 are oriented in a common direction and have directivity responses indicated by principal beams 161 and 162, respectively, which are 120° wide. The receiving antenna 111 is directly connected to a combiner and distributor 26 while the transmitting/receiving antenna 112 is connected thereto through a duplexer 36. Each transmitter 13 of transmitter/receiver assemblies 115-1 to 115-L for frequency channels f1s to f1L inclusive of control channels and communication channels is connected to the transmit port of the combiner and distributor 26 while receivers 15-1 and 15-2 are connected to the respective receive port of the combiner and distributor 26 for the antennas 111 and 112, thus allowing the transmission and the reception of the control channel and the communication channel. Communication channel transmitter/receiver assemblies 121-1 to 121M for frequency channels f21 to f2M each include a transmitter 122 which is connected to the transmit port of the combiner and distributor 26 and also each include receivers 123 and 124 which are connected to the respective receive port of the combiner and distributor 26 for the antennas 111 and 112, thus allowing the transmission and the reception of the communication channels. Each of the receivers 15-1 and 15-2 is adapted to diversity reception as is each of the receivers 123 and 124.

Time slots which are utilized by the transmitter/receiver assemblies 115-1 to 115-L are shown in FIG. 4A and time slots which are utilized by the transmitter/receiver assemblies 121-1 to 121-M are shown in FIG. 4B. The beam 162 of the antenna which is used in each transmission has a width of 120°, and this means that a common beam is used for every frequency channel and time slot. A base station controller 126 allocates a channel which is used by either one of the transmitter/receiver assemblies 115-1 to 115-L and 121-1 to 121-M during a particular time slot.

As discussed, the arrangement which employs the direction finding of the mobile station and a result of such scan is used in switching a transmit/receive beam suffers from the accuracy of directional finding, the scale of equipment and the quantity of calculations.

It will also be seen that because a wide angle beam antenna is fixedly assigned to every channel in a conventional base station equioment, this means that the equipment dissipates a wasteful radiation power in directions in its service area (such as a sector, for example) other than the direction on which a desired mobile station is located, contributing to increasing the quantity of interferences with other base stations. It is an object of the invention to provide a mobile communication base station equipment which enables a communication with a mobile station with a narrow angle beam by performing a direction finding of an arriving radio wave at a higher accuracy with a minimum scale of equipment and with a minimum volume of calculations.

It is another object of the invention to provide a mobile communication base station equipment which allows the quantity of interferences caused by radiated power to be reduced as compared with the prior art.

According to a first aspect of the present invention, there are provided a pair of wide angle beam antennas located close to each other for substantially covering a service area which is covered by an entire assembly including a plurality of narrow angle beams. One of the antennas of the pair is connected to a communication receiver while the other antenna is connected to a direction finder receiver. The direction on which a mobile station transmitting a particular received radio wave is located is determined on the basis of phases of received signals from the both receivers. The function of the wide angle beam antenna may be served by one of the plurality of antennas which are used to form the narrow angle beams.

According to a second aspect of the present invention, there are provided a single wide angle beam antenna and a plurality of narrow angle beam antennas which collectively cover a service area of the wide angle beam antenna. A traveling speed of a mobile station and the direction of a narrow angle beam on which the mobile station is located are detected. On the basis of such information, when the traveling speed is high, one of communication channel transmitters/receivers capable of feeding transmitting power is allocated to the wide angle beam antenna while when the traveling speed is low, one of the communication channel transmitters/receivers capable of feeding transmitting power is allocated to the narrow angle beam antenna corresponding to the direction on which the mobile station is located.

DETAILED DESCRIPTION OF EMBODIMENTS

Figure 1:
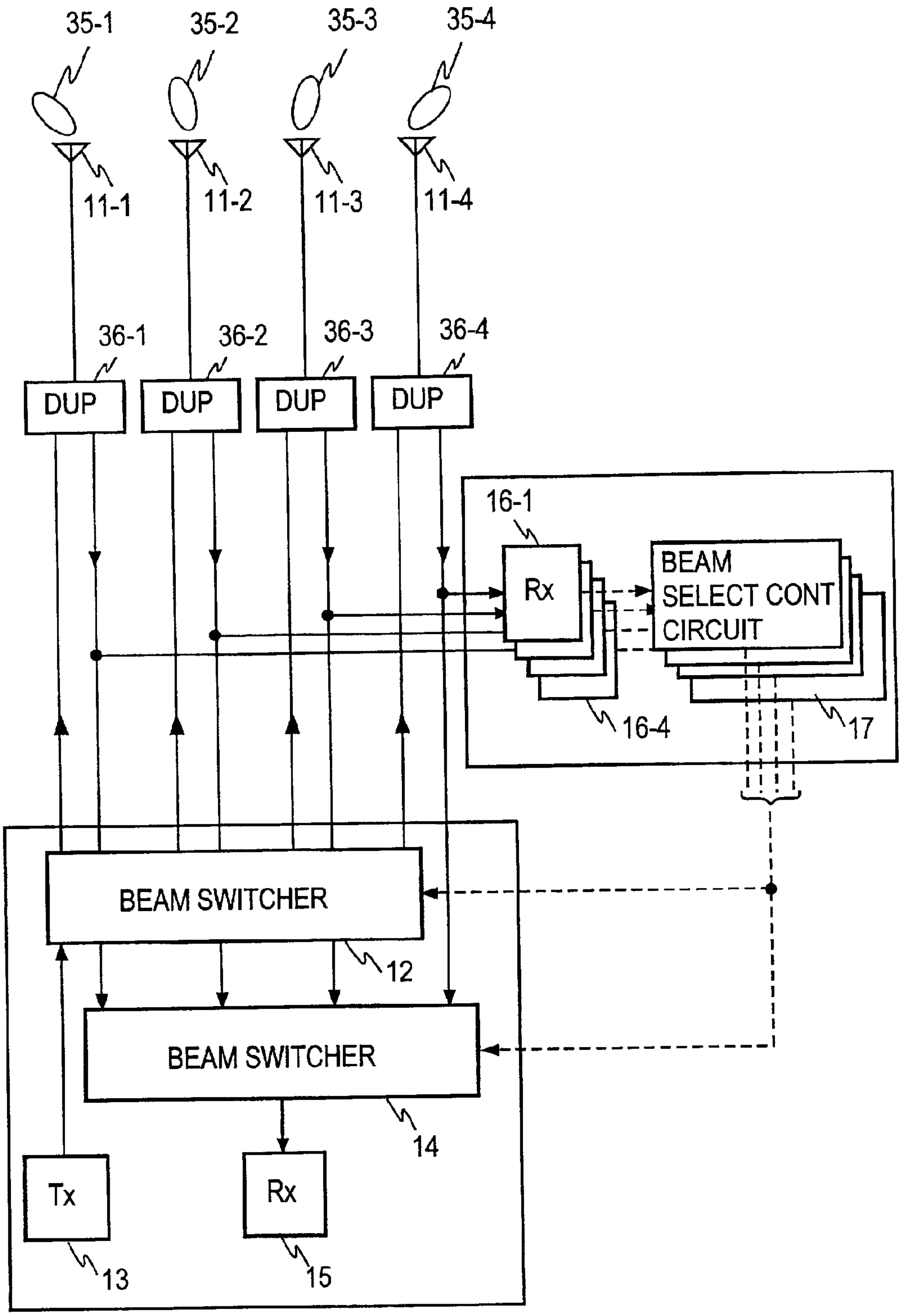
FIG. 1 PRIOR ART
FIG. 1 is a block diagram of a conventional mobile communication base station equipment.
Figure 5A:
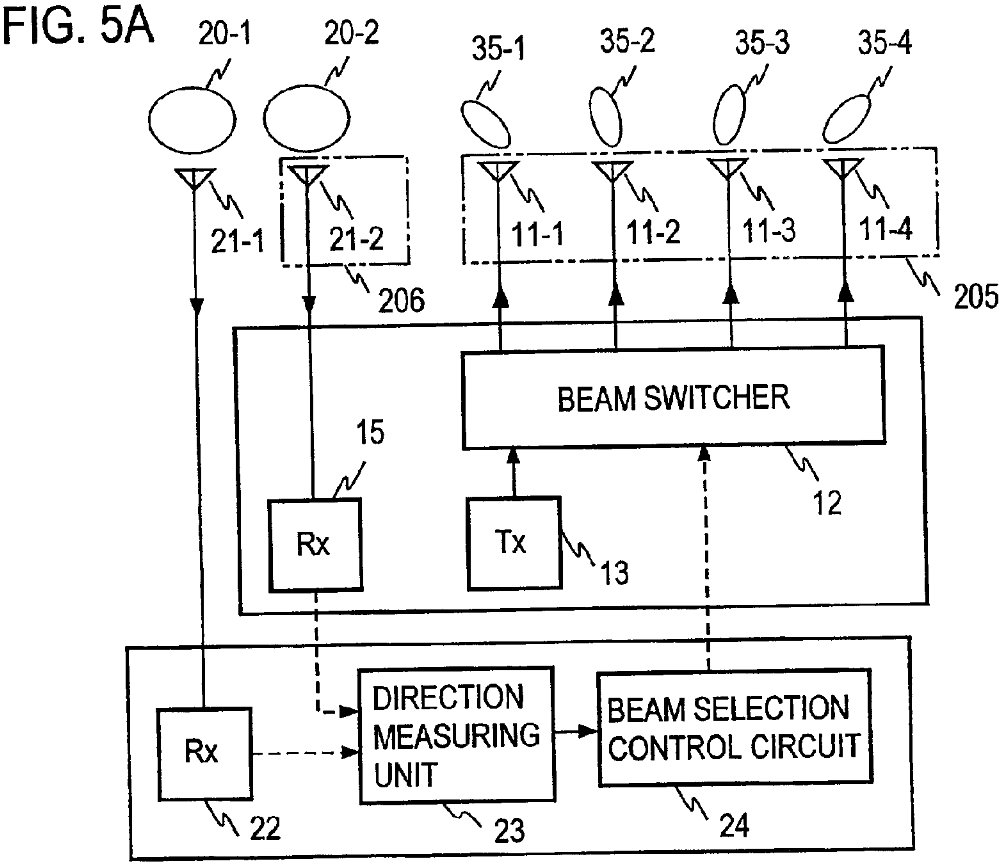
FIG. 5A is a block diagram of an embodiment according to a first aspect of the present invention.

FIG. 5A shows an embodiment according to the first aspect of the present invention, and corresponding parts to those shown in FIG. 1 are designated by like reference characters as used in FIG. 1, it being understood that throughout the description to follow, a similar convention is followed. In this embodiment, there are provided a pair of antennas 21-1 and 21-2 which exhibit a wide angle directivity response (or wide angle beam). Each of the wide angle beam antennas 21-1 and 21-2 is capable of substantially covering a service area which is collectively covered by narrow angle beam antennas 11-1 to 11-4. It is to be understood that the both antennas 21-1 and 21-2 are located close to each other so as to be within the order of one-half the wavelength (λ) of radio waves involved, and have wide angle beams 20-1 and 20-2 having central axes which are parallel to each other.

A direction finder receiver 22 is connected to one of the wide angle beam antennas, 21-1, while a communication receiver 15 is connected to the other wide angle beam antenna 21-2. A received signal form the communication receiver 15 and a received signal from the direction finder receiver 22 are input to a direction measuring unit 23, which determines the direction of a mobile station transmitting the radio wave of the received signal on the basis of a phase difference between the both received signals. A result of the measurement is input to a beam selection control circuit 24, which controls a beam switcher 12, thus connecting a transmitter 13 to one of the narrow angle beam antennas 11-1 to 11-4 having the direction of a beam 35-i (where i=1,2,3 or 4) which is aligned with the determined direction.

Figure 5C:
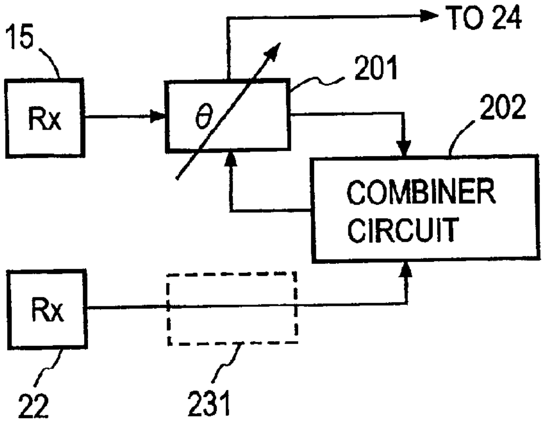
FIG. 5C is a block diagram of a specific example of a direction measuring unit shown in FIG. 5A.

Channel information, synchronization information or a channel estimation information which is received by the communication receiver 15 is received under the same terms and conditions as the direction finder receiver 22. Since the wide angle beam antennas 21-1 and 21-2 are located close to each other, it follows that the correlation between the received signals from the wide angle beam antennas 21-1 and 21-2 is close to 1. Accordingly, by detecting the phase difference between the both received signals and adjusting the phase so that these signals cancel each other, namely choosing these signals to be of opposite phases, it is possible to estimate the arriving direction on the basis of the phase difference is alone since the correlation between the signals is substantially equal to 1 with a minimal amplitude difference. By way of example, as illustrated in FIG. 5C, the received signal from one of the receivers, 15, is fed to a variable phase shifter 201, the output of which is added with the output signal from the other receiver 22 in a combiner circuit 202. A phase shift which occurs in the variable phase shifter 201 is controlled in accordance with an output from the combiner circuit 202 so that the combiner circuit 202 delivers a zero output. It is to be understood that the both inputs to the combiner circuit 202 are pre-processed to an equal amplitude. Accordingly, when the both inputs to the combiner circuit 202 are of opposite phases to each other, it provides an output of zero, and a phase shift which prevails in the variable phase shifter 201 represents a phase difference θ between the both received signals, which is then delivered to the beam selection control circuit 24.

Figure 5B:
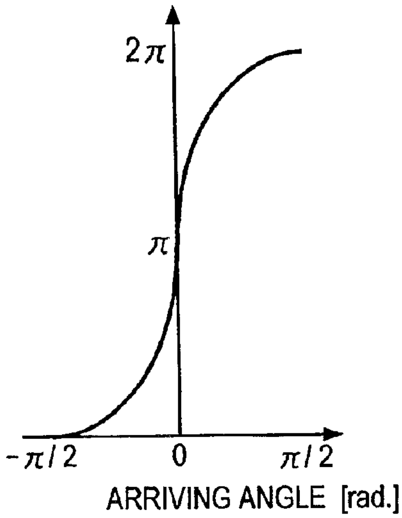
FIG. 5B graphically shows a relationship between a phase difference and an angle of an arriving radio wave.
Figure 6:
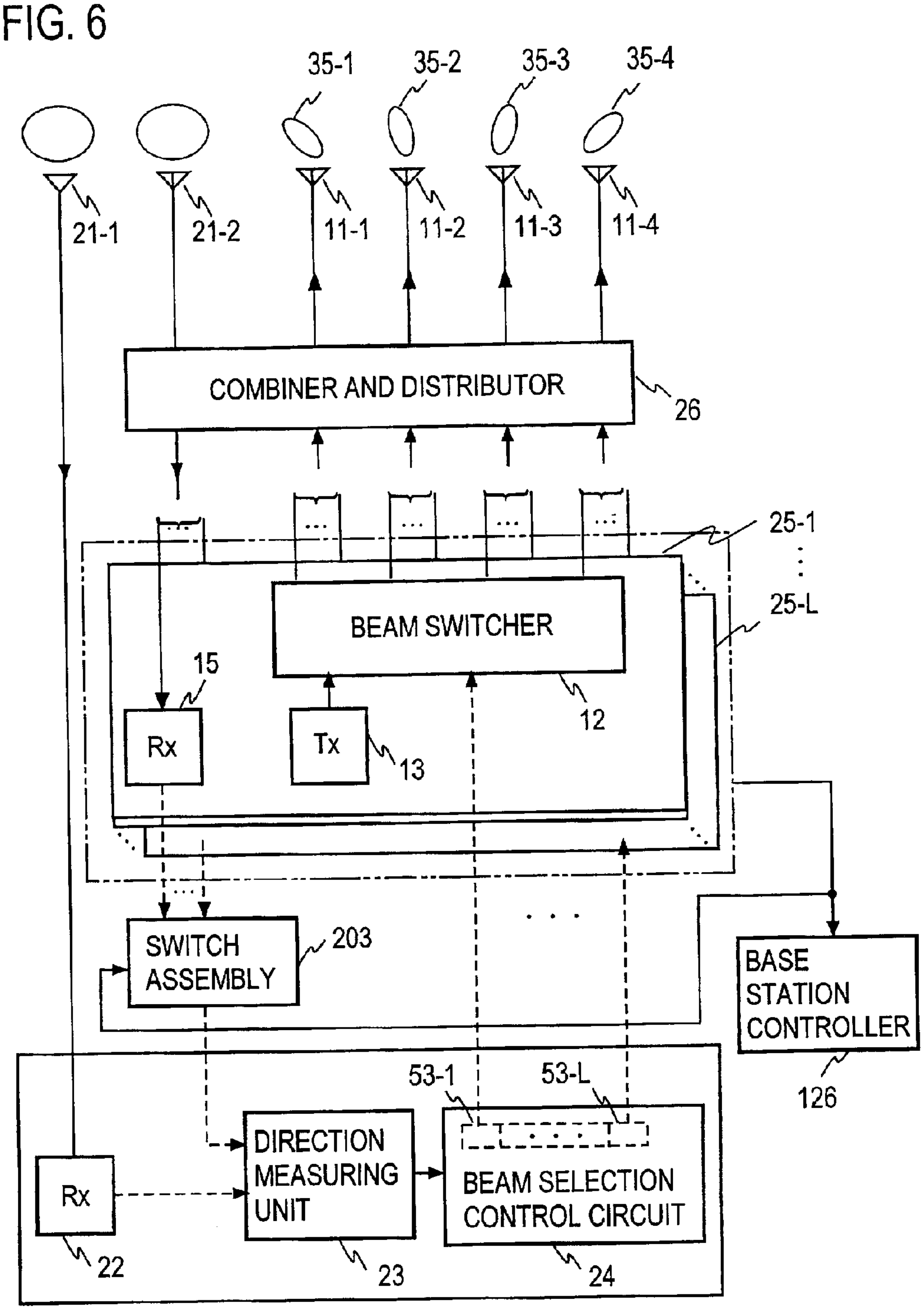
FIG. 6 is a block diagram illustrating the application of the embodiment shown in FIG. 5A to a plurality of communication channels.

Thus, because the spacing between the antennas 21-1 and 21-2 are equal to λ/2 or less, the phase difference (or phase shift) θ has a one-to-one correspondence with respect to the arriving angle, as shown in FIG. 5B. When the phase difference (or phase shift) θ is equal to π, the arriving direction of the radio wave forms an angle of 0 with respect to a perpendicular or a bisector of a line joining the antennas 21-1 and 21-2. As the phase difference (or adjusted phase shift) θ becomes less than π, the arriving direction shifts to the left from the perpendicular, and conversely as the phase difference (or adjusted phase shift) θ becomes greater than π, the arriving direction shifts to the right from the perpendicular. Accordingly, the beam switcher 12 is operated to connect the transmitter 13 to the antenna 11-i having the narrow angle beam 35-i which corresponds to the arriving direction which has been estimated by the phase difference (or adjusted phase shift) θ. In this manner, the transmitting beam 35-i of the base station equipment can be made to track the direction of the mobile station as it travels. It should be noted that the arriving direction of the radio wave can be detected merely by determining the phase difference (or adjusting the phase shift) without resort to adaptive signal processing and/or inverse matrix calculation.

Where there exist a plurality of communication channels, an arrangement as shown in FIG. 6 is used where parts corresponding to those shown in FIG. 5A are designated by like reference characters as used before. What differs from the arrangement of FIG. 5A is only the addition of a plurality of transmitters/receivers 25-1 to 25-L each including a beam switcher 12, a transmitter 13 and a receiver 15, a combiner and distributor 26 and a switch assembly 203. Outputs corresponding to respective narrow angle beams of the beam switchers 12 of the transmitters/receivers 25-1 to 25-L are combined together in the combiner and distributor 26 to be fed to corresponding ones of the narrow angled antennas 11-1 to 11-4. A received signal from a wide angle antenna 21-2 is distributed by the combiner and distributor 26 to be fed to respective communication receivers 15 of the transmitters/receivers 25-1 to 25-L. The channel allocation which determines which channels are used by the respective transmitters/receivers 25-1 to 25-L for purpose of communication is controlled by a base station controller 126. The base station controller 126 repeats sequentially establishing the channel which is allocated to one of the transmitters/receivers 25-1 to 25-L in the direction finder receiver 22, and each time the channel is established therein, it derives the received signal from the communication receiver 15 of one of the transmitters/receivers 25-1 to 25-L for which this channel has been allocated by controlling the switch assembly 203 to be fed to the direction measuring unit 23. The beam selection control circuit 24 includes output parts 53-1 to 53-L in a manner corresponding to the respective transmitters/receivers 25-1 to 25-L. A result of measurement of the direction on which a mobile station with which each of the transmitters/receivers 25-1 to 25-L is in communication is located is stored in the output parts 53-1 to 53-L, and the measured direction which is stored in the output parts 53-1 to 53-L is fed to the beam switcher 12 of the respective transmitter/receiver 25-1 to 25-L.

The direction finder receiver 22 is arranged to operate in arbitrary channel in a time division manner, and the phase difference θ of its received signal with respect to the corresponding receiver 15 in one of the transmitters/receivers 25-1 to 25-L is determined in the direction measuring unit 23, thus estimating the arriving direction of the received radio wave. The beam selection control circuit 24 controls the beam switcher 12 in one of the transmitters/receivers 25-1 to 25-L for which the channel has been established, thus selecting the narrow angle beam for purpose of transmission. In this manner, as a mobile station which is in communication with one of the transmitters/receivers 25-1 to 25-L travels, the transmitted beam may be made to track the direction of that mobile station. The embodiments shown in FIGS. 5A and 6 represent an arrangement in which the narrow angle antennas 11-1 to 11-4 form the narrow angle beam forming antenna assembly 205 and the wide angle antennas 21-2 form the wide angle beam forming antennas 26.

Figure 7A:
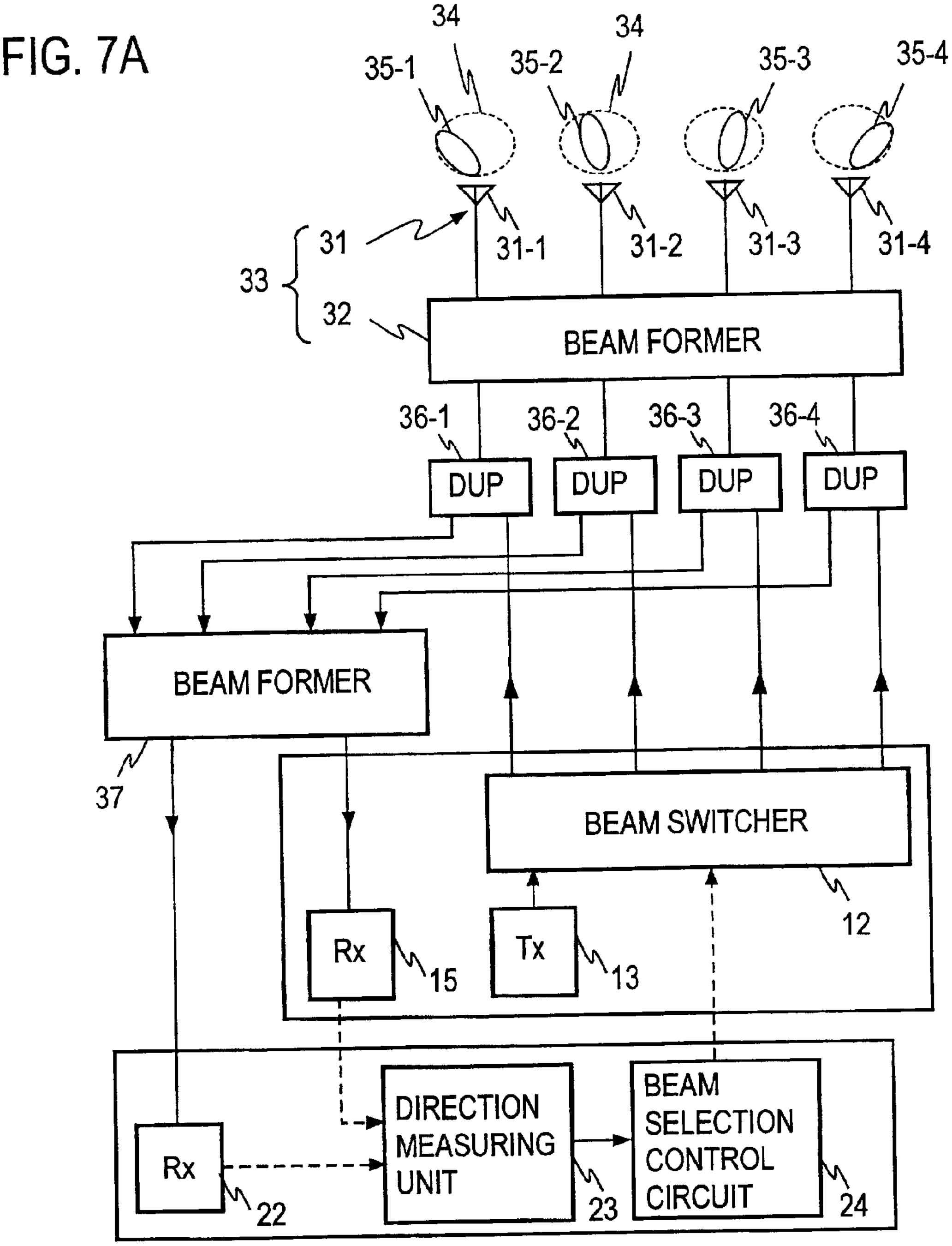
FIG. 7A is a block diagram of an embodiment according to the first aspect of the present invention when a narrow angle beam and a wide angle beam use an antenna in common.
Figure 7B:
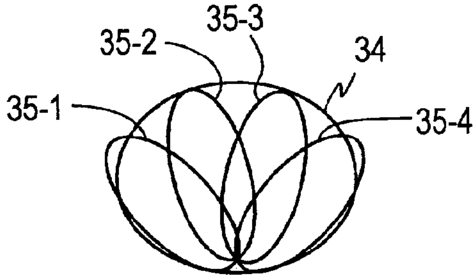
FIG. 7B illustrates a relationship between the plurality of narrow angle beams and the wide angle beam shown in FIG. 7A.

An example in which part of antennas which forms a plurality of narrow angle beams also serves as a wide angle beam antenna will now be described. This example is shown in FIG. 7A where a multi-beam antenna 33 is formed by an array antenna 31 including wide angle beam antenna elements 31-1 to 31-4 and a beam former 32 which may comprise Butler matrix, for example. The antenna elements 31-1 to 31-4 are arrayed at a spacing on the order of one-half the wavelength (λ) of the radio wave involved and each exhibit a wide angle directivity response (as indicated by a wide angle beam) 34 shown in broken lines in FIG. 7A. The multi-beam antenna 33 has a plurality of narrow angle directivity responses (narrow angle beams) 35-1 to 35-4 which are directed in mutually different directions. As shown in FIG. 7B, the service area of the wide angle beam 34 can be substantially covered by the narrow angle beams 35-1 to 35-4 collectively.

A switched output from the beam switcher 12 can be fed through duplexers 36-1 to 36-4, respectively, to any one of the four ports of the beam former 32. For example, when the four ports of the beam former 32 are fed from the duplexers 36-1 to 36-4, each input forms a transmitted wave as represented by one of the narrow angle beams 35-1 to 35-4. In this manner, the output from the duplexer 36-1 forms the transmitted wave corresponding to the narrow angle beam 35-1, for example.

A received output from the multi-beam antenna 33 (corresponding to a signal from the input port during the transmission) is fed through the duplexers 36-1 to 36-4 to a beam former 37 which may comprise Butler matrix, for example, to be converted back to the received signal according to the directivity response of the wide angle beam antenna elements 31-1 and 31-2, for example, or corresponding to the wide angle beam 34. One of the received signals corresponding to the antenna elements 31-1 and 31-2 is fed to the communication receiver 15 while the other is fed to the direction finder receiver 22. It is to be noted that a coordination is made so that channel information, synchronization information and/or channel estimation information which is received by the communication receiver 15 is also received by the direction finder receiver 22 under the same terms and conditions.

Figure 8:
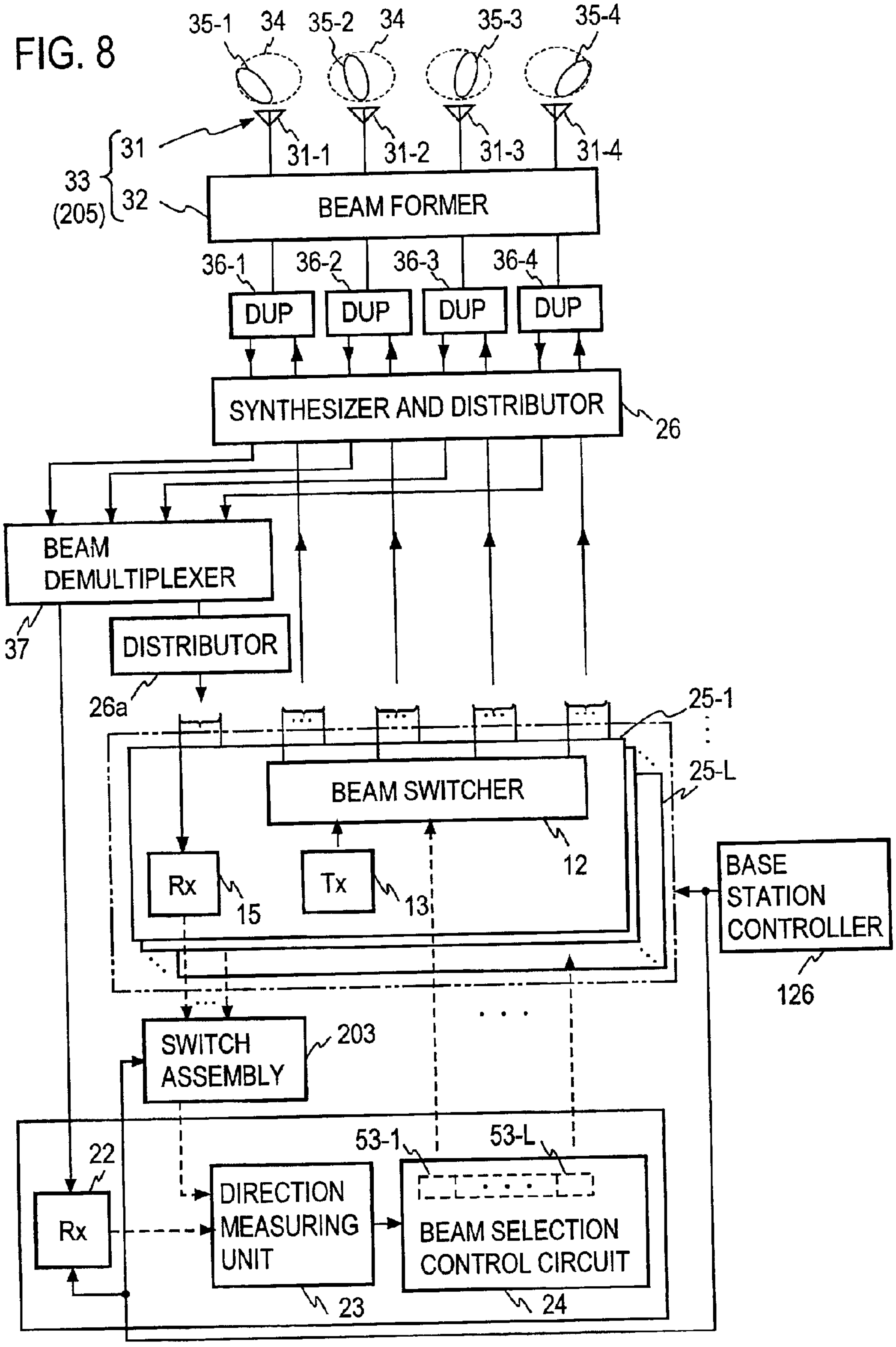
FIG. 8 is a block diagram of an example in which the embodiment shown in FIG. 7A is applied to a plurality of communication channels.

A spacing between the antenna elements 31-1 and 31-2 is on the order of one-half the wavelength or less, and accordingly, the arriving direction of the radio wave can be estimated by detecting the phase difference between the both received signals by the direction measuring unit 23, generally in the similar manner as described above in connection with FIG. 5A. Thus, an output from the transmitter 13 can be fed to the narrow angle beam which is oriented in this direction.

Where there are a plurality of communication channels, a resulting arrangement will be as shown in FIG. 8, and what differs from FIG. 7A is the addition of a plurality of transmitters/receivers 25-1 to 25-L each including a beam switcher 12, a transmitter 13 and a receiver 15, a combiner and distributor 26, a distributor **26*a* and a switch assembly 203. Corresponding outputs from the respective beam switchers 12 are combined in the combiner and distributor 26 to be fed to corresponding ones of the duplexers 36-1 to 36-4. Outputs from the beam former 37 which are to be fed to the communication receivers 15 are distributed by the distributor 26*a* to the communication receivers 15 of the respective transmitters/receivers 25-1 to 25**-L.

The direction finder receiver 22 is arranged to operate in an arbitrary channel in a time division manner, and a phase difference between the received signal from the direction finder receiver 22 and the received signal from the communication receiver 15 for that channel is detected by a direction measuring unit 23, which selects and establishes a narrow angle beam to be used for the transmission from the transmitter 13 which forms a pair with this communication receiver 15. In this manner, as a mobile station which is in communication with one of the transmitters/receivers 25-1 to 25-L travels, it is possible to cause the transmitted beam to track the mobile station in the direction in which it travels. The embodiment shown in FIGS. 7 and 8 represent an arrangement in which the multi-beam antenna 33 comprises a narrow angle beam forming antenna assembly 205 while the combination of the multi-beam antenna 33 and the beam former 37 forms the wide angle beam forming antenna assembly 206.

Figure 9:
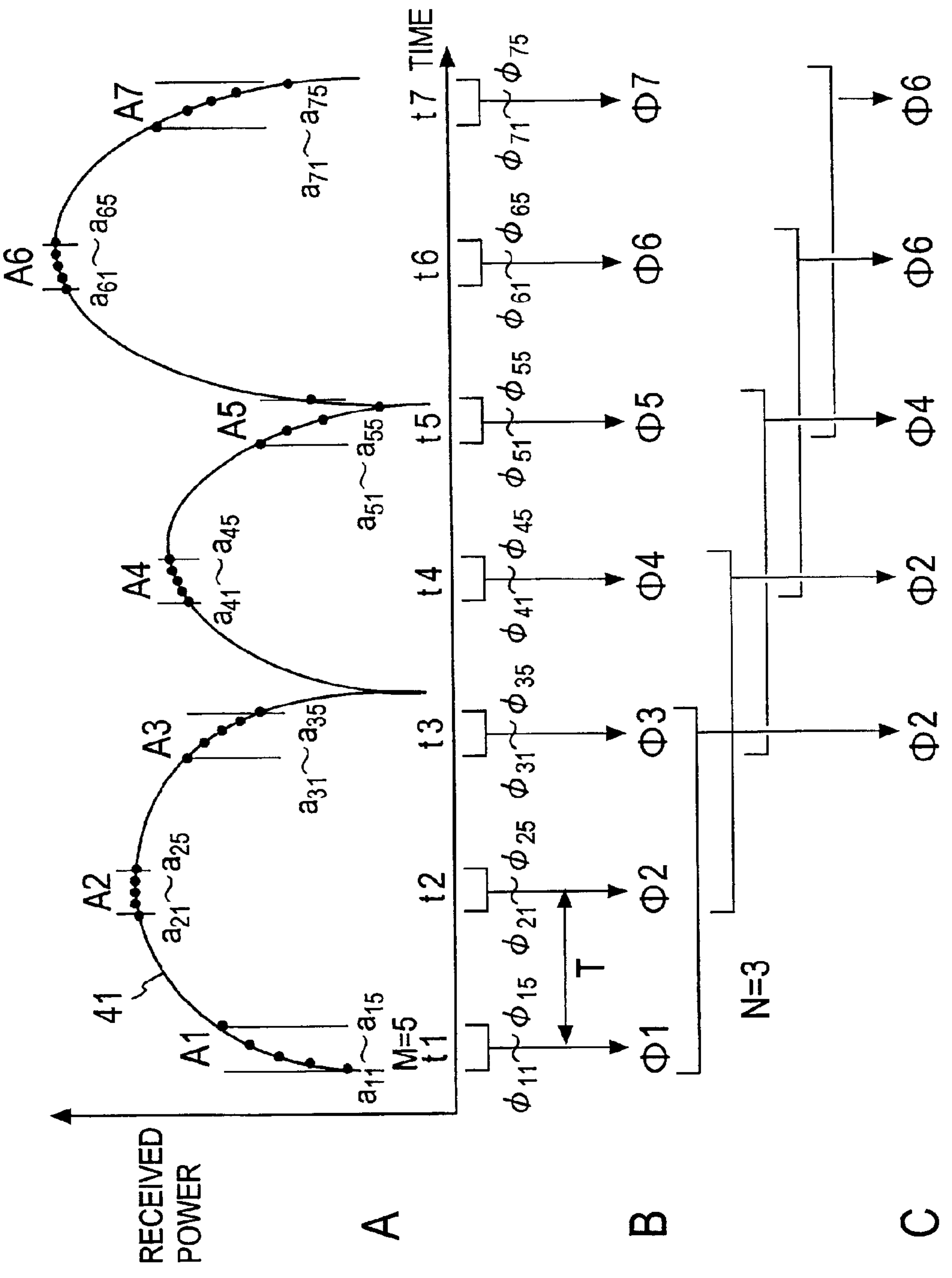
FIGS. 9A, B and C are illustrations of the principle of operation for obtaining a reliable measured direction.

Preferred examples of the direction measuring unit 23 shown in FIGS. 5 to 8 will now be described. The principle of operation for one example is shown in FIG. 9. A received signal which is input to the direction measuring unit 23 has a received power which undergoes a variation due to a fading effect or the like, as indicated by a curve 41 in FIG. 9A, for example. The determination of an i-th reliable measured direction Φi will be described. An instantaneous received power is measured a plurality of times (which are chosen to be N=five times in FIG. 9) at a time interval of T to determine values ai1 to aiM. A typical value is obtained as a mean power Ai of ai1 to aiM (FIG. 9A). At the same time, an instantaneous phase difference between the both received signals is measured to obtain an instantaneous measured direction ϕi1 to ϕiM, and a typical value is obtained as a mean measured direction Φi of ϕi1 to ϕiM (FIG. 9B). In this manner, a mean power and a mean measured direction are obtained as A1, A2, . . . Φ1, Φ2, . . . at the time interval of T. A plurality of values (which are N=3 in FIG. 9) for the mean power and the mean measured direction are stored in a memory. By way of example, at time t3, it is determined that the reliable measured direction is the mean measured direction Φ2 which is obtained at time t2 when the maximum mean power A2 is obtained among the three stored mean powers A1, A2 and A3 in the memory (it will be noted that the mean power A2 at time t2 is greater than the remaining values A1 and A3). This memory is sequentially updated by new data in a first-in and first-out (FIFO) manner. Thus, at time t4, the mean power A1 and the mean direction Φ1 at time t1 are discarded while mean power A4 and mean direction Φ4 which are obtained anew are stored. At time t4, the mean powers A2, A3 and A4 stored in the memory are compared against each other again, thus determining a new reliable direction according to the described algorithm (it will be seen that in FIG. 9, the reliable direction is determined to be Φ2). The time interval T and the number of data N which is used in determining the maximum are chosen such that the correlation between the mean powers is minimized. The fading structure which occurs is determined from the plurality of mean powers (which is N=3 in the present example) which are compared against each other, and a choice is made so that a mean direction which lies in a depression caused by the fading effect is not selected. By choosing the parameters T and N suitably, the selection of a measured direction which occurs during a depression in the received power where a large error is likely to occur as the reliable direction is avoided. In the example shown in FIG. 9, Φ5 is not selected as the reliable direction because the received mean power A5 is low. For each measurement which takes place at the time interval of T, a decision is rendered whether or not the reliable direction is to be updated on the basis of the mean powers obtained during past several measurements, (which is N=3 in FIG. 9). FIG. 9B shows the mean measured direction and FIG. 9C shows the reliable direction determined and the direction in which the determination has occurred.

As mentioned above, it is preferred that the time interval T between successive measurements be determined to provide a reduced correlation between the mean powers obtained so that the fading structure can be recognized from N received mean powers and so that a comparison between the received powers in a depression zone is avoided. It will be seen that a longer time interval is preferred for T, but when a longer time interval is chosen, an updating of the measured direction is slowed down in a corresponding manner, degrading the tracking capability for a mobile station which travels rapidly. It is preferred that the time interval T be chosen in accordance with the traveling speed of the mobile station or the period of the fading effect. The number N of the mean powers which are used in detecting the maximum mean power is preferably chosen to avoid a depression zone in the received power and to enable the fading structure to be recognized from the mean powers being compared. For these reasons, the number of mean powers is chosen in a range from 3 to 10. The mean powers are measured a plurality of times (M-times) at the time interval of T in order to reduce the influence of noises, and should be made a plurality of times as close to each other as possible. The number M of measurements may be on the order of 10 to 20, for example.

Figure 10:
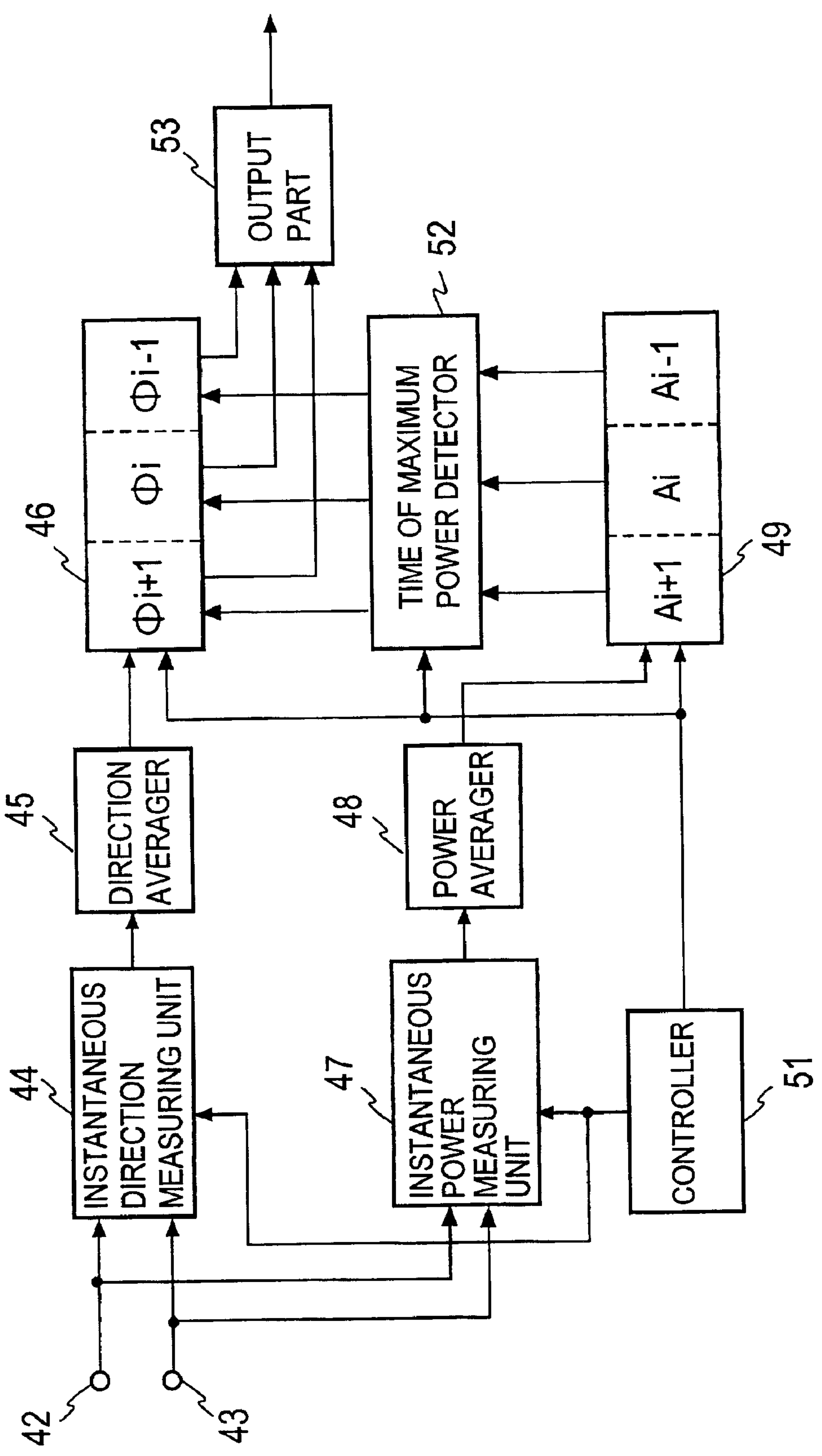
FIG. 10 is a schematic view showing a functional arrangement of a direction measuring unit 23 which is based on the principle illustrated in FIG. 9.

An exemplary functional arrangement which is used to determine the reliable direction is shown in FIG. 10. Both received signals which are input to a direction measuring unit 23 are applied to a pair of terminals 42 and 43 of an instantaneous direction measuring unit 44 where an instantaneous phase difference between the both received signals is measured a plurality of times (or M-times) to determine an instantaneous direction on the basis of the instantaneous phase difference. M values of the instantaneous measured direction are averaged in a direction averager 4, and a resulting mean direction is stored in a direction FIFO memory 46.

The received signals applied to the terminals 42 and 43 are also input to an instantaneous power measuring unit 47 where the instantaneous power is measured M-times, and M values of the instantaneous power are averaged in a power averager 48, and a resulting mean power is stored in a power FIFO memory 49. The measurement of the instantaneous power may take place with respect to only one of the received signals applied to the terminals 42 and 43, or may take place with respect to a sum or a mean value thereof. A controller 51 operates the instantaneous direction measuring unit 44 and the instantaneous power measuring unit 47 at the time interval of T, and the outputs from the direction averager 45 and the power averager 48 are stored in the direction FIFO memory 46 and the power FIFO memory 49, respectively. The time of measurement when a maximum one of the mean powers which are stored in the power FIFO memory 49 is obtained is detected by a maximum power time detector 52, and the mean direction which prevails at this point in time is read out from the direction FIFO memory 46 to be delivered as the reliable direction from an output part 53, and as an output representing the measured direction determined by the direction measuring unit 23.

Figure 11:
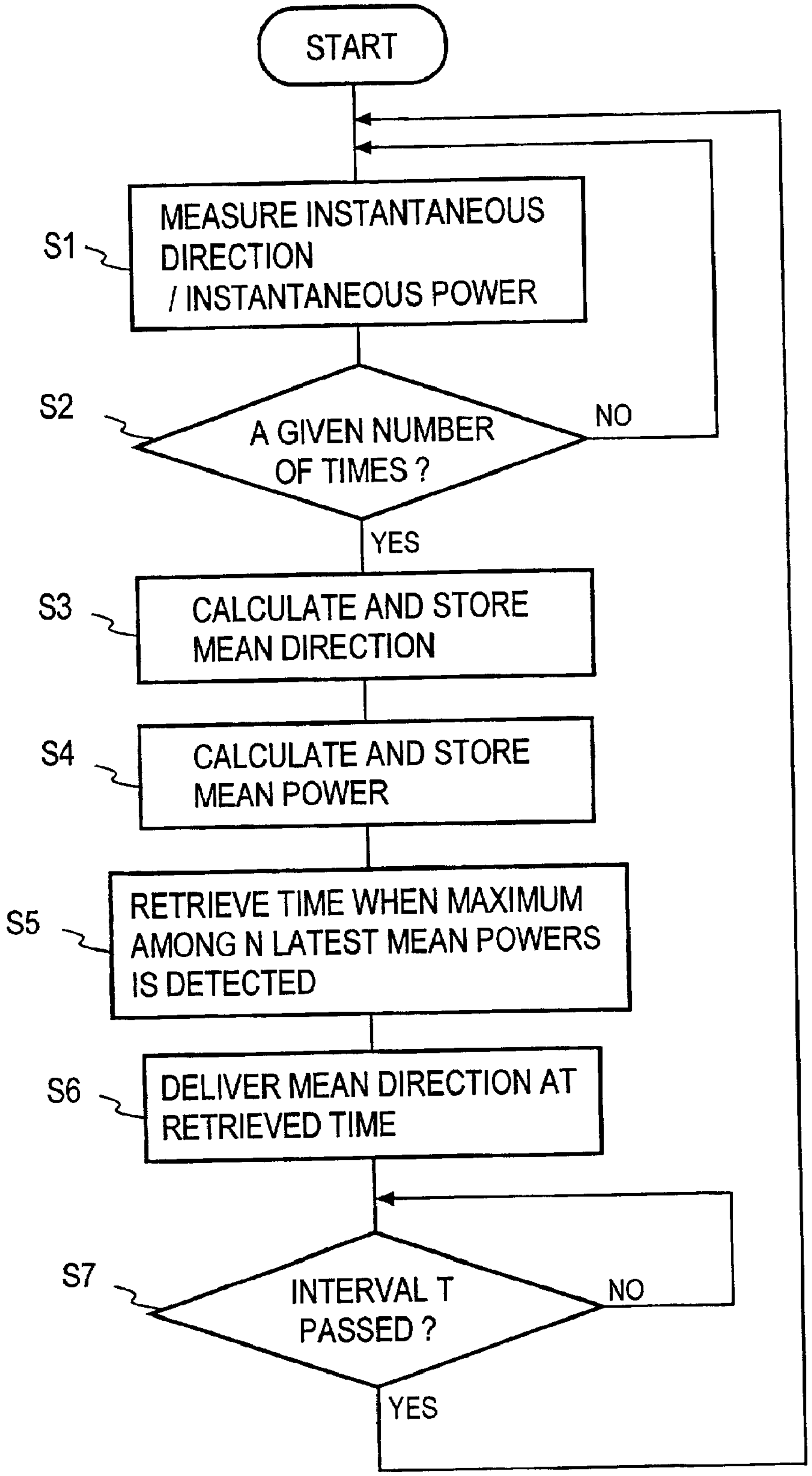
FIG. 11 is a flow chart of an exemplary processing procedure according to the principle illustrated in FIG. 9.

FIG. 11 shows a processing procedure which takes place in the arrangement of FIG. 10. Initially, the instantaneous direction and the instantaneous power are measured (S1). The measurement is repeated until the measurement takes place a given number of times M (S2). After the given number of measurements, a mean direction from M values of the instantaneous measured direction is calculated to be stored in the direction FIFO memory 46 (S3). A mean power of M values of the instantaneous measured power is calculated to be stored in the power FIFO memory 49 (S4). A point in time when a maximum one of M values of the mean power which are stored in the power FIFO memory 49 is retrieved (S5), and the mean direction which prevails at the retrieved point in time is read out from the direction FIFO memory 46 to be delivered as the reliable measured direction from the direction measuring unit 23 (S6). Then, the elapse of the time interval T is waited for, subsequently returning to step S1 (S7).

Figure 12:
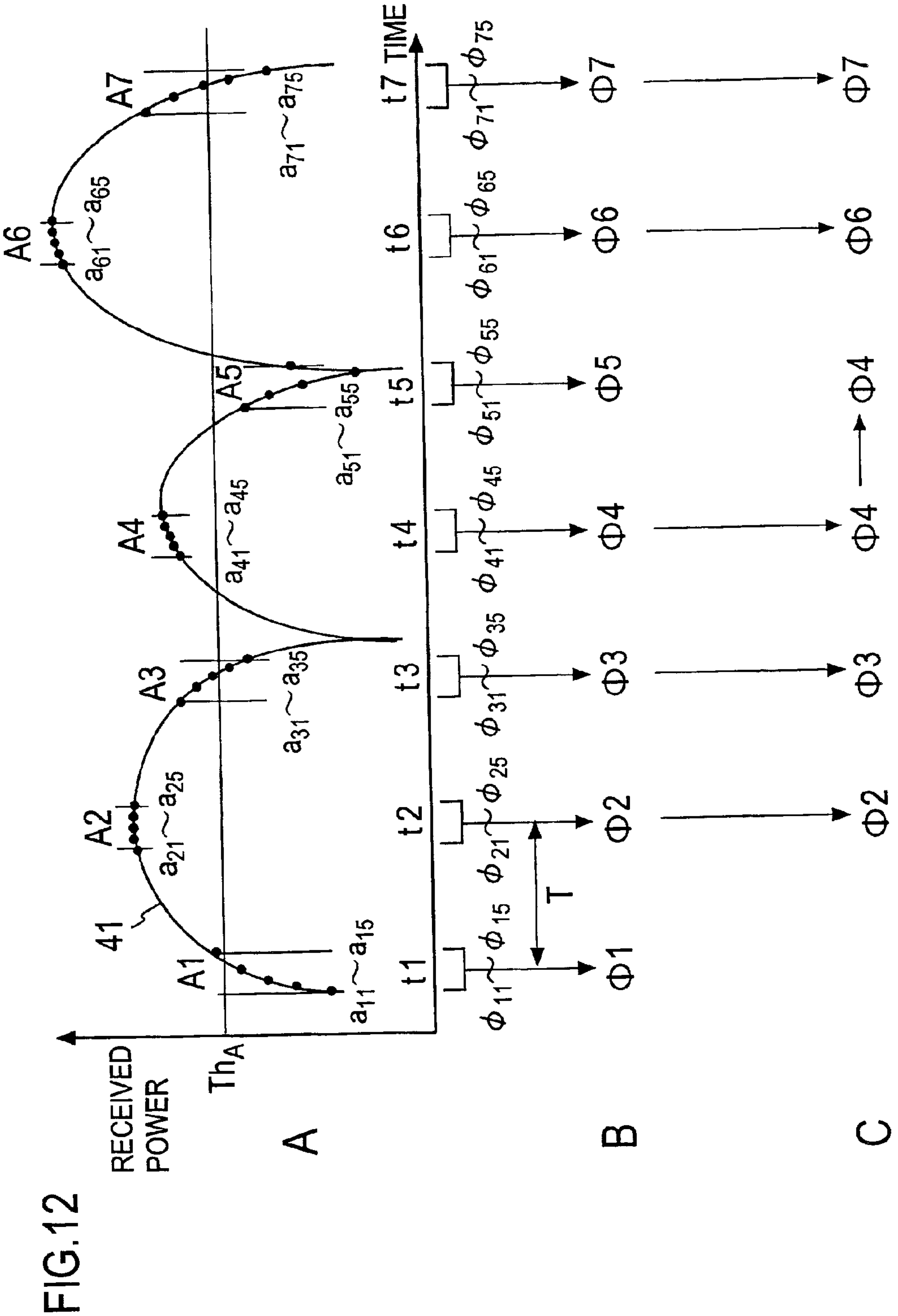
FIGS. 12A, B and C are illustrations of another principle of operation for obtaining a reliable measured direction.

Another principle of operation for obtaining a reliable measured direction will now be described with reference to FIG. 12. The determination of an i-th reliable measured direction Φi will be described. The instantaneous received power is measured M times (which is equal to five times in FIG. 12) at the time interval of T to obtain values ai1 to aiM, and a typical value is obtained as a mean power Ai of ai1 to aiM (FIG. 12A). At the same time, an instantaneous measured direction ϕi1 to ϕiM is measured from the phase difference between the both received signals, and a typical value is obtained as a mean measured direction Φi of ϕi1 to ϕiM (FIG. 12). The mean value and the mean measured direction are obtained at the time interval of T in this manner. Assume that a mean power M3 is obtained at time t3, and if A3 is greater than a threshold value $Th_A$, the mean measured direction Φ3 which prevails at time t3 is determined to be a reliable measured direction and is used to update an output measured direction, while if A3 is less than the threshold value $Th_A$, the measured direction is not updated. When the time interval T and the threshold value $Th_A$ are suitably chosen, a measured direction which occurs during a depression in the received power where a large error in the measured direction is likely to occur cannot be selected as the reliable measured direction. By way of example, in FIG. 12, the mean received power A5 which prevails at time t5 is less than the threshold value $Th_A$, and thus, the mean measured direction Φ5 cannot be adopted as the reliable measured direction. Instead, the direction measuring unit 23 delivers an output of Φ4 at time t4, and does not deliver an output or again delivers Φ4 at time t5. In the example shown in FIG. 12, only those mean directions shown in FIG. 12C are delivered as the reliable measured direction.

An exemplary functional arrangement for a direction measuring unit 23 which should operate to carry out the principle of operation mentioned above is shown in FIG. 13 where the parts corresponding to those shown in FIG. 10 are designated by like reference characters as used before. The instantaneous direction is measured by an instantaneous direction measuring unit 44 M times, and a mean direction is calculated by a direction averager 45. The instantaneous power is measured M times by an instantaneous power measuring unit 47, and a mean power is calculated in a power averager 48. The mean power is compared against a threshold value $Th_A$ fed from a threshold presetter 56 in a comparator 55. If it is equal to or greater than the threshold value $Th_A$, the mean direction delivered from the direction averager 45 is used to update the measured direction which is retained in an output part 53, whereby it is delivered as a reliable measured direction. If it is found in the comparator 55 that the mean power is less than the threshold value $Th_A$, the measured direction retained in the output part 53 is not updated.

Figure 13:
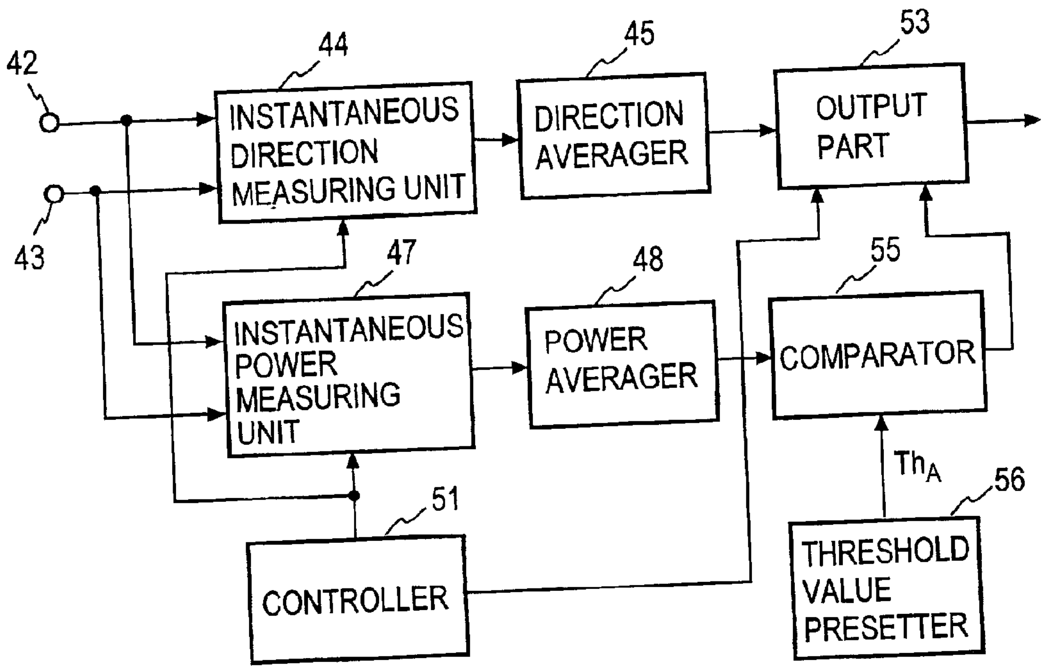
FIG. 13 is a schematic view showing a functional arrangement of a direction measuring unit 23 which is based on the principle illustrated in FIG. 12.
Figure 14:
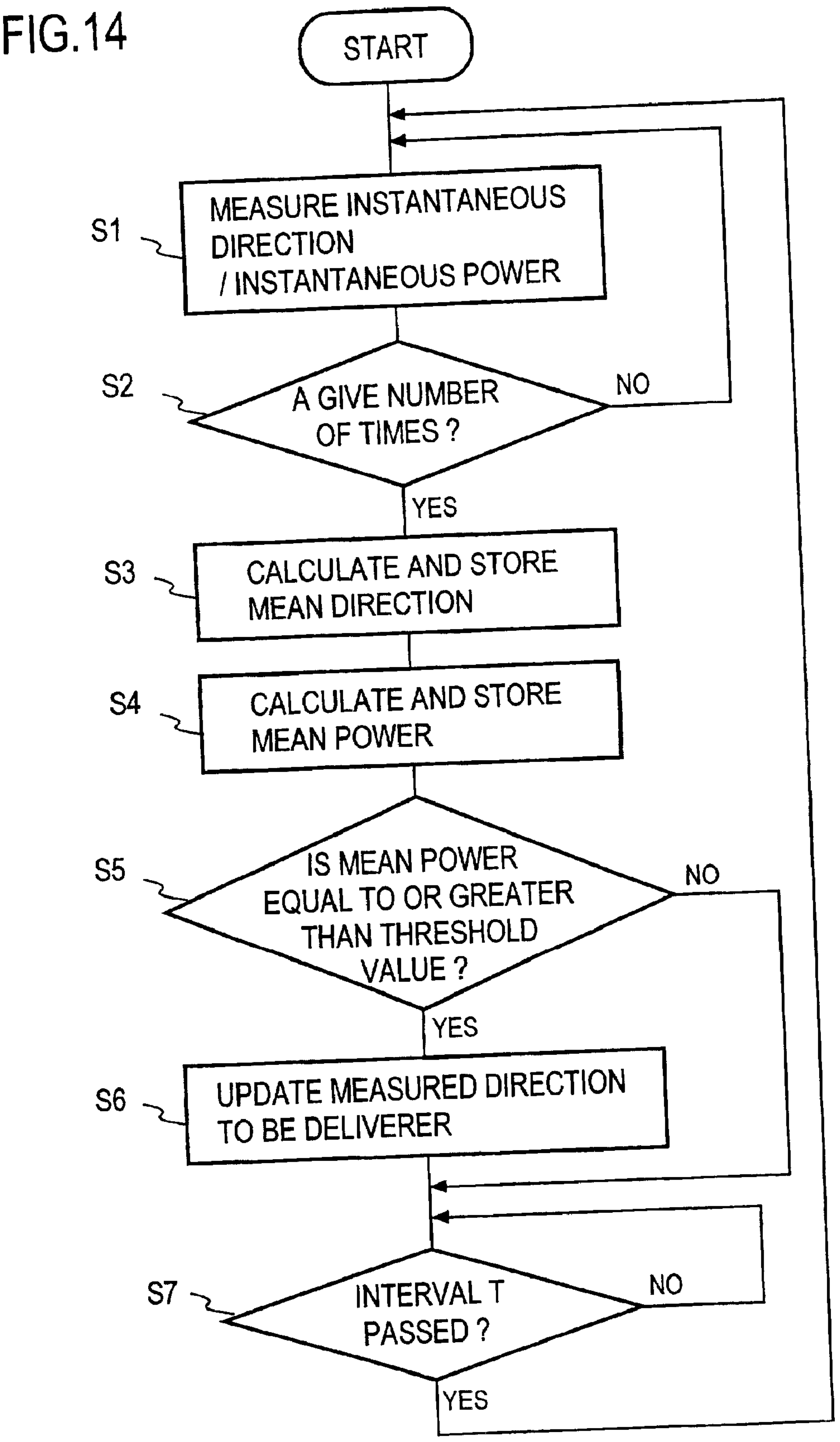
FIG. 14 is a flow chart of an exemplary processing procedure according to the principle illustrated in FIG. 12.

An exemplary processing procedure which is used for the arrangement shown in FIG. 13 is shown in FIG. 14. The instantaneous direction and the instantaneous power are measured a given number of times (M times) (S1 and S2). A mean direction for M values of the instantaneous direction and a mean power for M values of the instantaneous power are calculated (S3 and S4). An examination is made to see if the mean power is equal to or greater than the threshold value $Th_A$ (S5), and if the mean power is equal to or greater than $Th_A$, the output measured direction is updated (S6) while if the mean power is less than $Th_A$, the output measured direction is not updated, thus waiting for the time interval T to pass, whereupon the operation returns to step S1 (S7).

Figure 15:
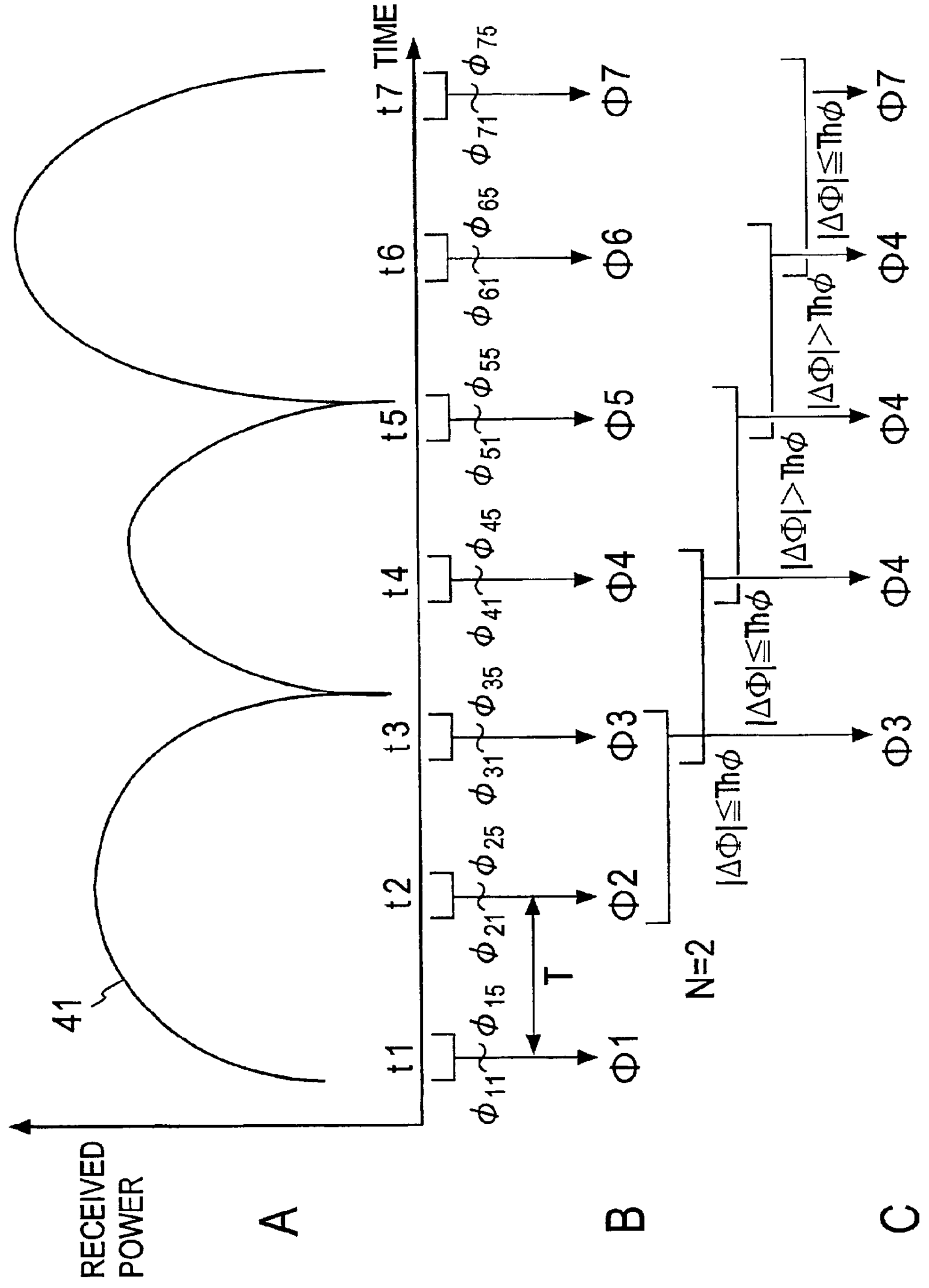
FIGS. 15A, B and C are illustrations of a further principle of operation for obtaining a reliable measured direction.

A further principle of operation for obtaining a reliable measured direction is illustrated in FIG. 15. The determination of an i-th reliable direction Φi will be described. The instantaneous measured direction is measured M times (which is equal to five times in FIG. 15) at the time interval of T to obtain values ϕi1 to ϕiM, and a typical value is obtained as a mean measured direction Φi of ϕi1 to ϕiM (FIG. 15B). A plurality of mean measured directions (which is assumed to be N=2 in this example) are stored in a memory. At time t3, a mean measured direction Φ3 is obtained and is stored in a memory. A difference between Φ3 and a mean measured direction Φ2 for two values stored in a memory or $|\Delta\Phi|=|\Phi i-\Phi i-1|$is then calculated. If the difference $|\Delta\Phi|$ is less than a threshold value Thϕ, the mean measured direction Φ3 which is now obtained, is determined to be a reliable measured direction. The memory is sequentially updated in a first-in and first-out manner. For example, at time t4, the mean measured direction Φ2 obtained at time t2 is discarded from a memory while a new mean measured direction Φ4 is stored. At time t4, the difference between the two mean measured directions Φ3 and Φ4 in the memory is obtained, and the difference $|\Delta\Phi|$ is compared against the threshold value Thϕ. In this example,$|\Delta\Phi|<$Thϕ, and accordingly the output measured direction is updated to Φ4 (FIG. 15C). By suitably choosing the time interval T and the threshold value Thϕ for the difference of the mean measured direction, a mean measured direction which occurs during a depression in the received power where a large error in the measured direction is likely to occur cannot be adopted as a reliable measured direction. In the present example, the mean measured direction Φ5 obtained at time t5 occurs for a low received level A5, and a difference over the mean measured direction Φ4 increases to cause $|\Delta\Phi|$ to exceed the threshold value Thϕ, whereby it cannot be adopted as the reliable measure direction, as indicated in FIG. 15C.

It is to be noted that when the received power is low, a mean phase difference increases or the mean phase difference increases as a result of the received power being buried into the noise.

Figure 16:
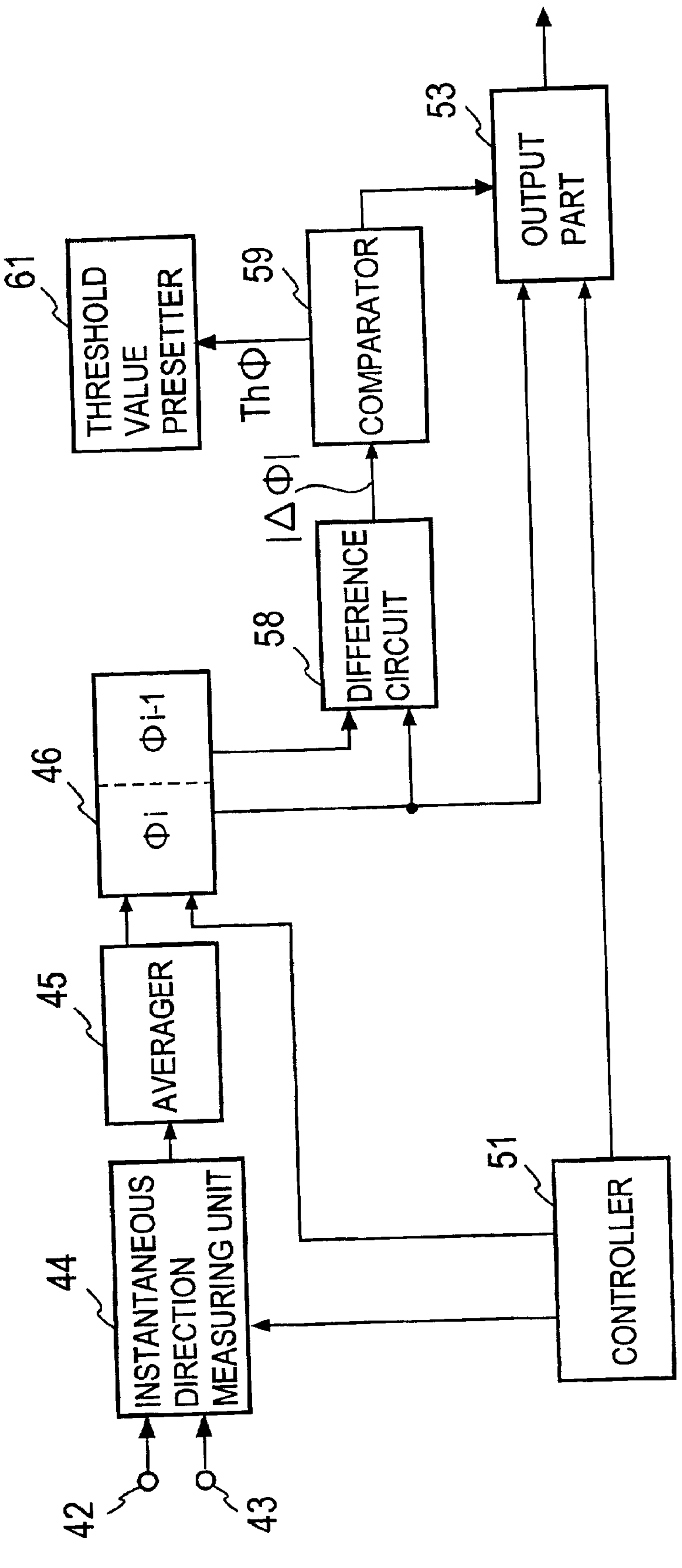
FIG. 16 is a schematic view showing an exemplary functional arrangement of a direction measuring unit 23 which is based on the principle illustrated in FIG. 15.

An exemplary functional arrangement of this direction measuring unit 23 is shown in FIG. 16 where parts corresponding to those shown in FIG. 10 are designated by like reference characters as used before. An instantaneous direction is measured from the phase difference between the both received signals by an instantaneous direction measuring unit 44 M times at a time interval of T. Resulting M values of the instantaneous measured direction is averaged in an averager 45 to be stored in an FIFO memory 46. The difference $|\Delta\Phi|$ between the two mean measured directions contained in the FIFO memory 46 is calculated by a difference circuit 58, and the difference $|\Delta\Phi|$ (is compared against the threshold value Thϕ supplied from a threshold presetter 61 in a comparator 59. If $|\Delta\Phi|\leqq$Thϕ holds, the mean measured direction Φi which is then stored in the memory 46 is used to update the measured direction which is retained by an output part 53. On the contrary, if $|\Delta\Phi|>$Thϕ, the output part 53 is not updated.

Figure 17:
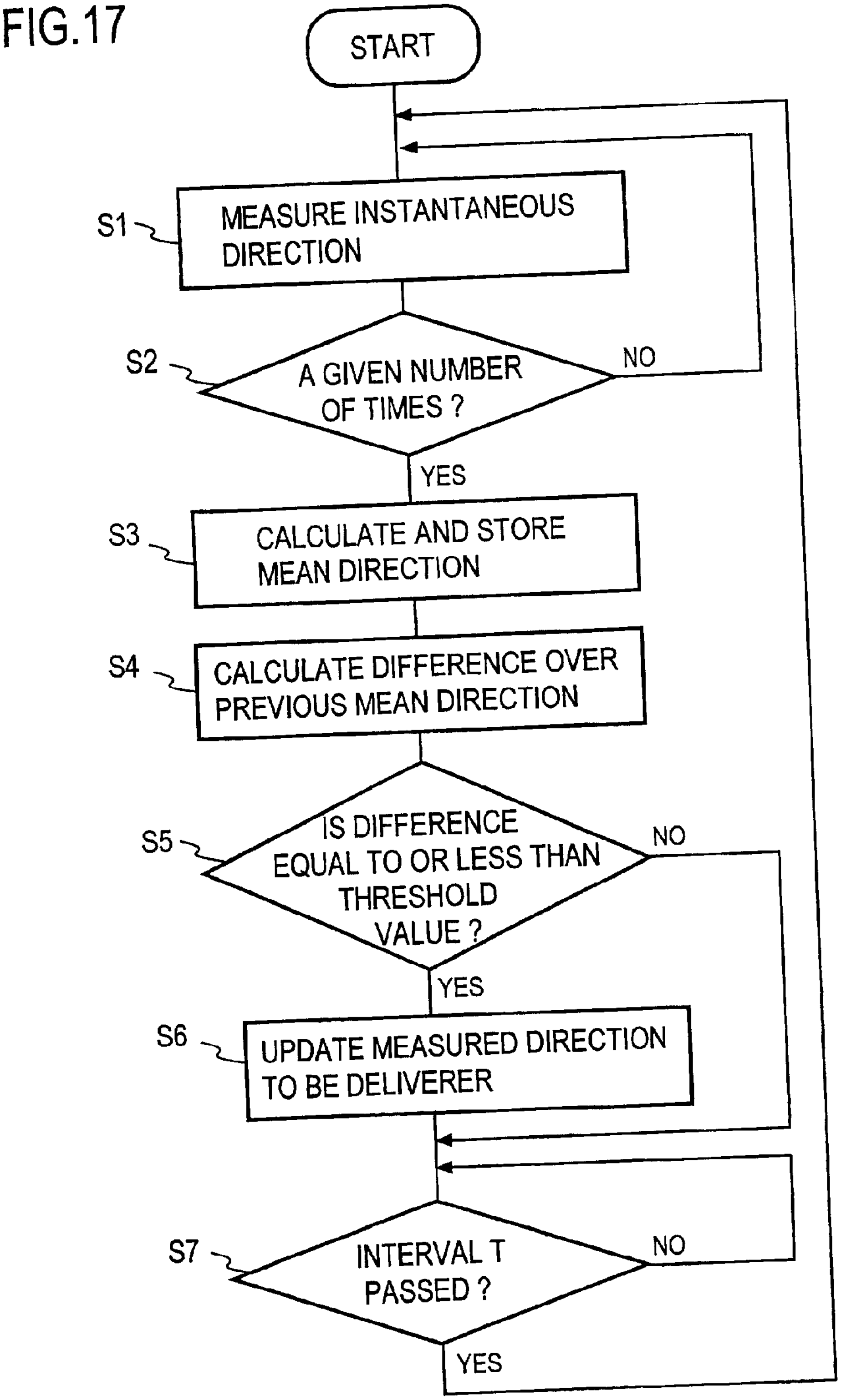
FIG. 17 is a flow chart of an exemplary processing procedure according to the principle illustrated in FIG. 15.

An exemplary processing procedure which is used with the arrangement shown in FIG. 16 is shown in FIG. 17. An instantaneous direction is measured on the basis of a phase difference between both received signals a given number of times (M times) (S1 and S2). M values of the instantaneous measured direction are averaged to be stored in a memory (S3). A difference $|\Delta\Phi|$ between the current and the previous mean measured value is calculated (S4), and an examination is made to see if $|\Delta\Phi|$ is equal to or less than the threshold value Thϕ (S5). If $|\Delta\Phi|\leqq$Thϕ, the measured direction from the output part 53 is updated by the latest mean measured direction. If $|\Delta\Phi|\leqq$Thϕ does not hold, the measured direction retained in the output part 53 is not updated, but the elapse of the time interval T is waited for, whereupon the operation returns to step S1 (S7).

Figure 18:
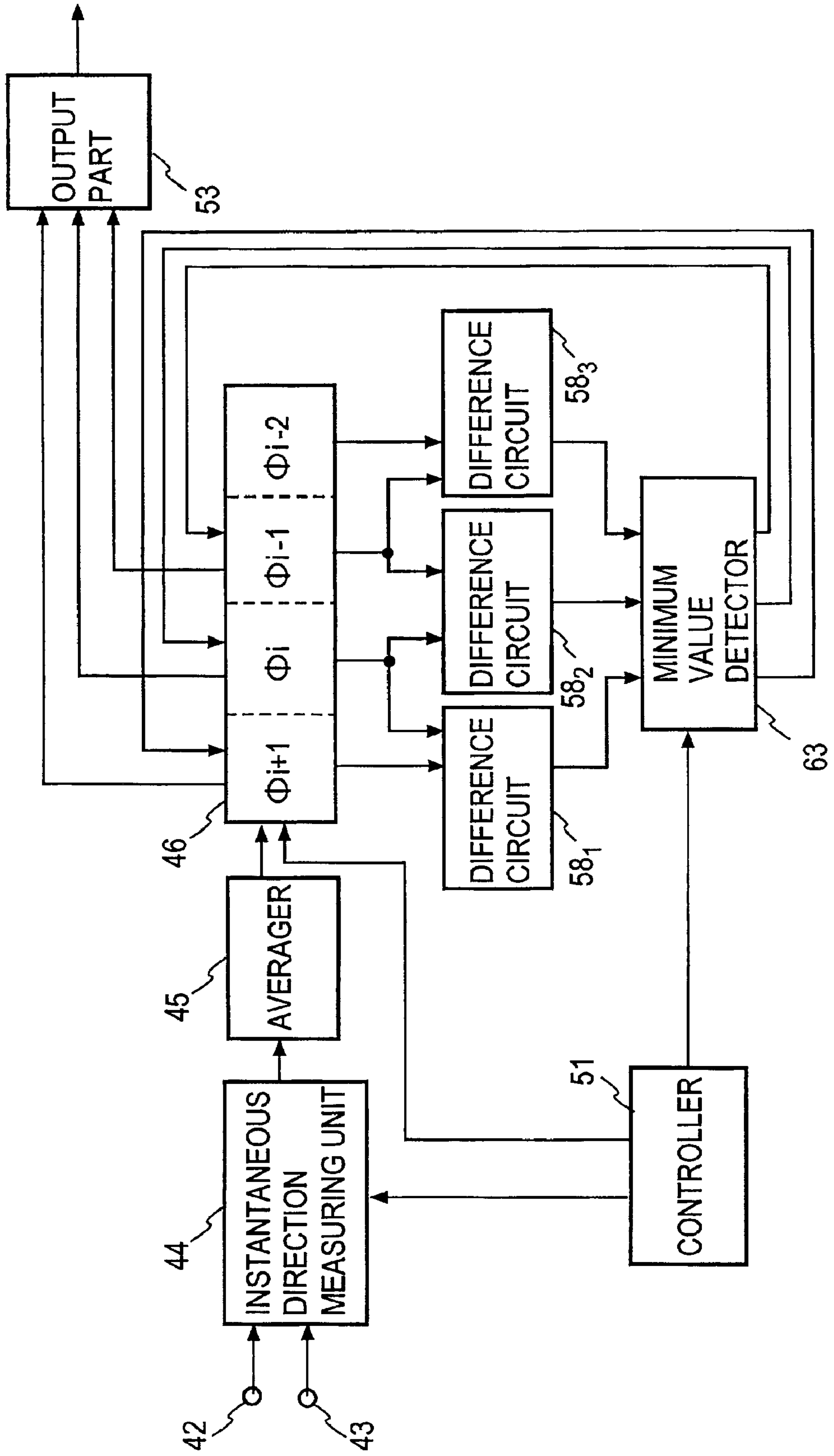
FIG. 18 is a schematic view showing a functional arrangement of a direction measuring unit 23 according to a further embodiment of obtaining a reliable measured direction.

An additional functional arrangement for the direction measuring unit 23 which obtains a reliable measured direction is shown in FIG. 18 where parts corresponding to those shown in FIG. 16 are designated by like reference characters as used before. The instantaneous direction is measured M times by an instantaneous direction measuring unit 44 at time interval of T, and M values of the instantaneous measured direction are averaged in an averager 45 to be stored in a FIFO memory 46. Thus, the FIFO memory 46 stores four latest mean measured directions Φi+1, Φi, Φi−1 and Φi−2, for example, thus storing a time sequence of four latest values of the mean measured direction.

Differences between each pair of adjacent mean measured directions in the time sequence are calculated by difference circuits $58_1$, $58_2$ and $58_3$. A minimum one of these differences $|\Delta\Phi_1|=|(\Phi i+1)-\Phi i|$, $|\Delta\Phi_2|=|\Phi i\ (\Phi i-1)|$ and $|\Delta\Phi_3|=|(\Phi i-1)-(\Phi i-2)|$ is detected by a minimum value detector 63. One of the two mean measured directions which are used in forming the difference having the minimum value is chosen as a reliable measured direction, and thus is read out from the FIFO memory 46 to be delivered to an output part 53. For example, if the output difference $|\Delta\Phi_2|$ from the difference circuit $58_2$ is a minimum value, one of the mean measured directions Φi and Φi−1 which are used in deriving the difference, preferably the latest one Φi, is read out from the memory 46 to be delivered to the output part 53. Alternatively Φi−1 may also be delivered.

Figure 19:
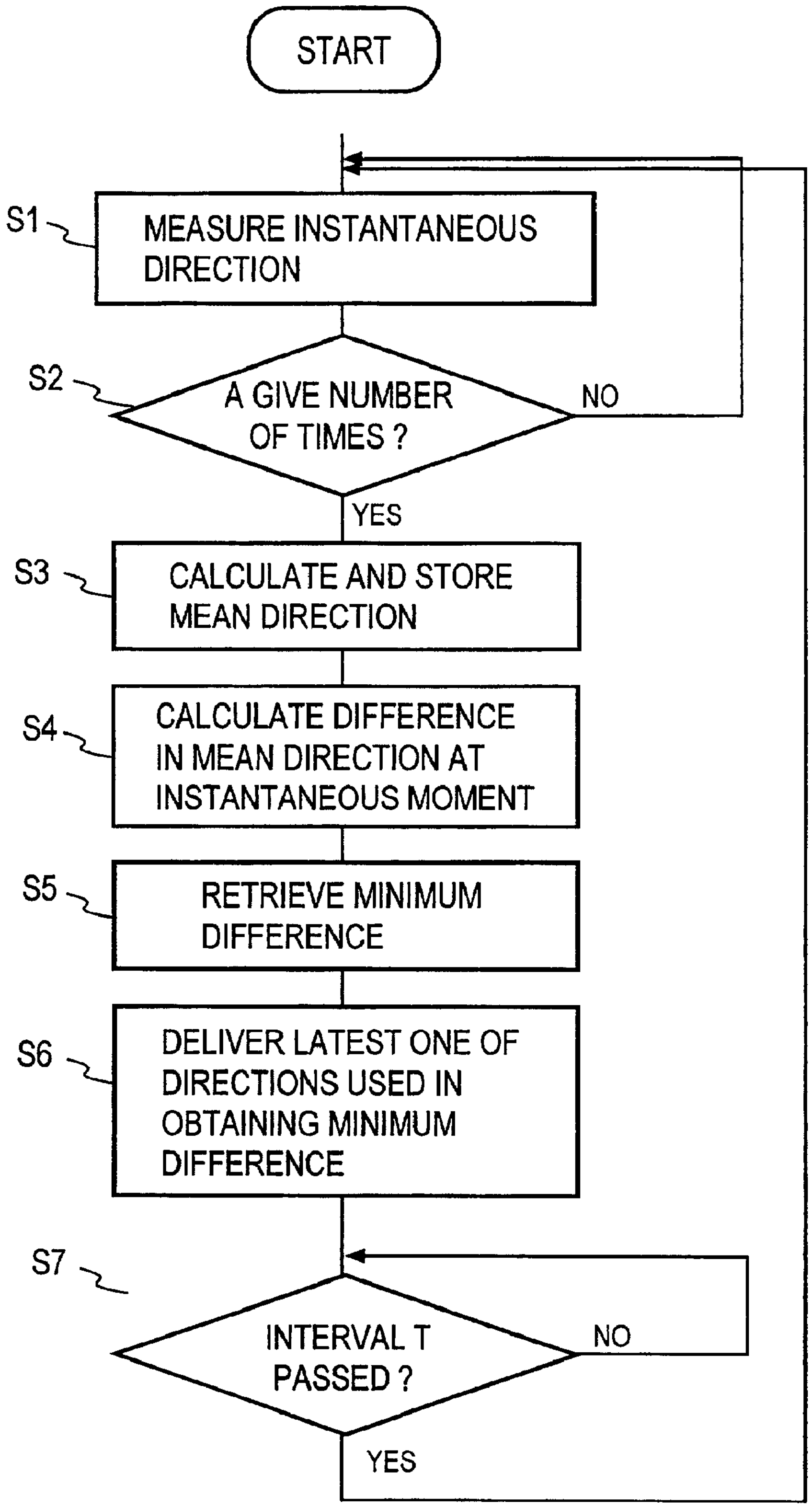
FIG. 19 is a flow chart of an exemplary processing procedure used by the direction measuring unit 23 shown in FIG. 18.

An exemplary processing procedure which is used with the arrangement shown in FIG. 18 is shown in FIG. 19. The instantaneous measured direction is measured M times (S1 and S2), and M values of the instantaneous direction is averaged to be stored in the FIFO memory 46 (S3). Differences (absolute values) between each pair of adjacent mean measured directions in the time sequence stored in the FIFO memory 46 are calculated (S4), and a minimum one of these differences is located. A latest one Φi of the two mean measured directions Φi and Φi−1 which are used in reaching the difference of the minimum value is delivered as a measured direction (S6). Subsequently, the operation returns to step S1 after waiting for the time interval T to pass (S7). Alternatively, Φi−1 may be delivered at step S6.

Figure 20:
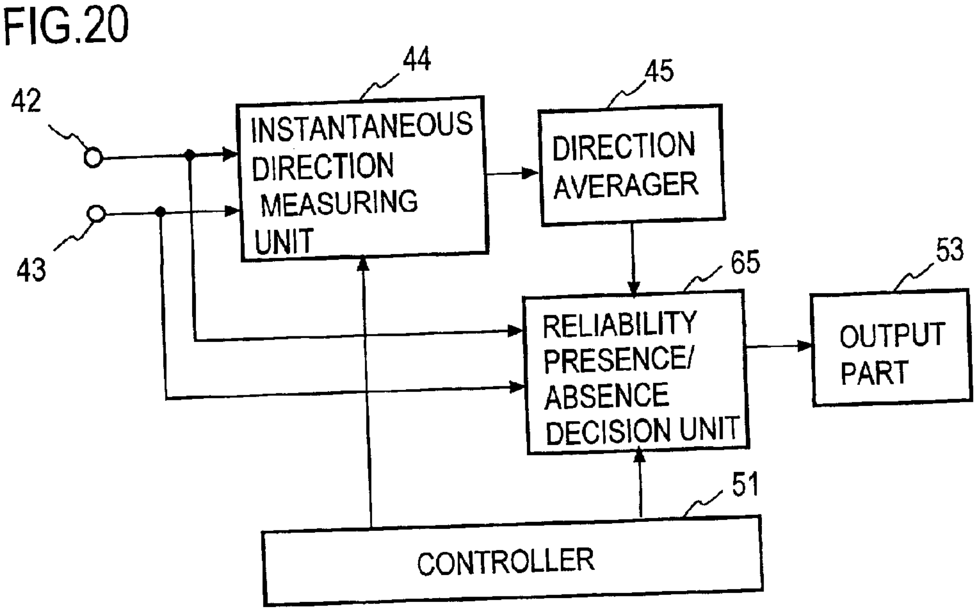
FIG. 20 is a schematic view showing a general functional arrangement of a direction measuring unit 23 for obtaining a reliable measured direction.

As discussed above for various embodiments, the direction measuring unit 23 is designed to be controlled by a controller 51, as shown in FIG. 20, such that an instantaneous direction measuring unit 44 measures an instantaneous phase difference between both received signals to determine an instantaneous direction on the basis of such phase difference, the measurement of the instantaneous direction is preferably repeated a plurality of times and a mean value of the plurality of instantaneous directions is obtained in a direction averager 45. Alternatively, the instantaneous phase difference is measured a plurality of times and a mean value over these instantaneous phase differences is determined, and a mean direction may be determined on the basis of the mean phase difference. In a reliability presence/absence decision unit 65, the presence or absence of the reliability in the mean direction is determined according to one of the techniques illustrated in FIGS. 9 to 19, and the direction which has been determined to be reliable is delivered to an output part 53 as a measured direction. In the embodiments shown in FIGS. 9 and 12, the instantaneous power of received signals has been measured, but alternatively, the instantaneous amplitude of the received signals may be measured.

Figure 21:
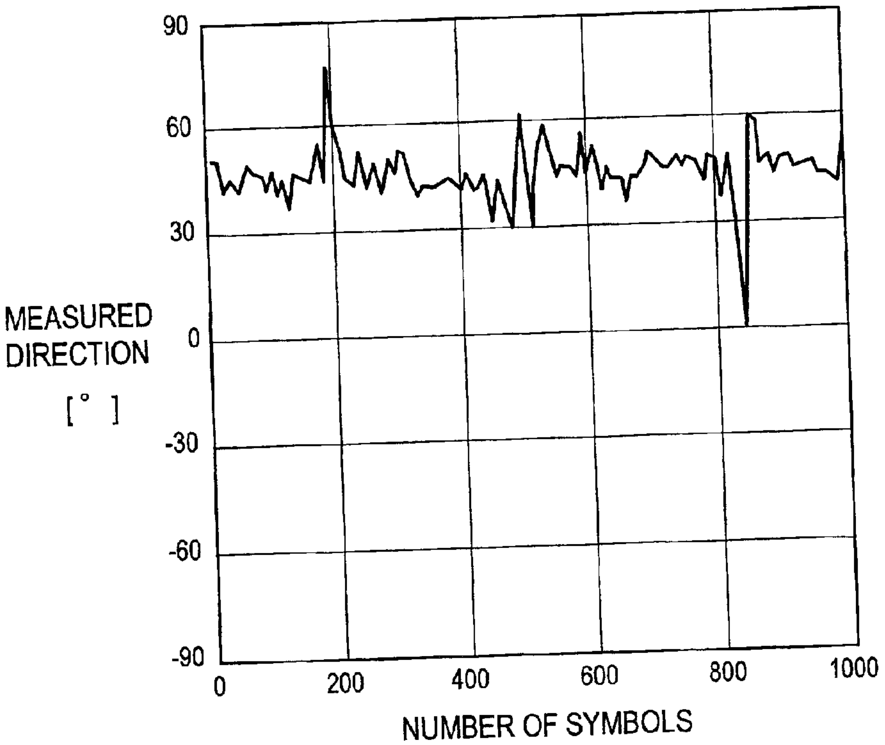
FIG. 21 graphically shows a result of experiments determining an instantaneous direction.
Figure 22:
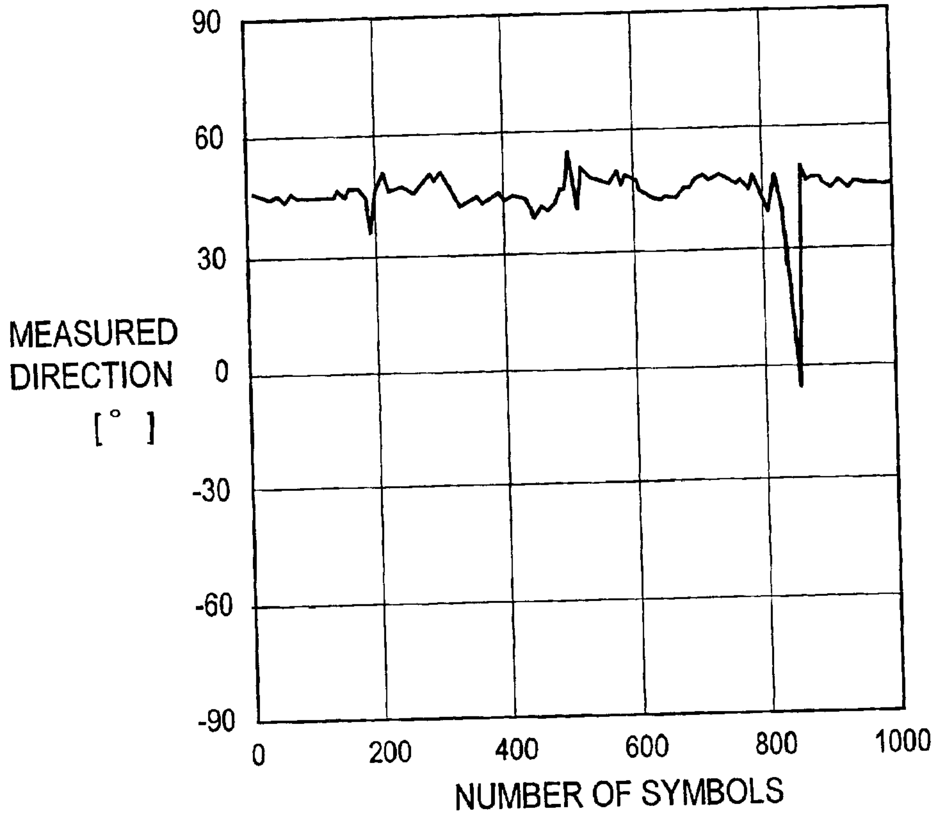
FIG. 22 graphically shows a result of experiments in which instantaneous directions measured are averaged to determine a mean direction.

As an example, FIG. 21 shows a result of experiments which determined a measured direction by the instantaneous direction measuring unit 44. In FIG. 21, the abscissa represents time in terms of the number of symbols, and the ordinate represents the measured direction. In the example shown, the actual arriving direction of the radio wave is equal to 45°. However, it will be noted that the result of experiments shown indicates the presence of a significant variation in the measured direction. It is believed that this is partly because the measured direction cannot remain constant, but undergoes a large variation under the influence of receiver noises. For this reason, values of the instantaneous measured direction which are obtained by M=10 repetitions are averaged in order to suppress the influence of noises. In this instance, a result of experiments for the mean measured direction or the output from the direction averager 45 for the received signals which are under the same conditions as for FIG. 21 is as shown in FIG. 22. It will be seen from the results shown in FIG. 22 that a variation in the measured direction can be reduced by averaging values of the instantaneous measured direction. However, FIG. 22 shows that there still remains a large variation which cannot be suppressed even after the averaging operation. It is believed that this is due to a substantial reduction in the received power, namely during a deep depression in the received power or due to a depression caused by a fading effect when the arriving radio wave has an extended spatial reach.

Figure 23:
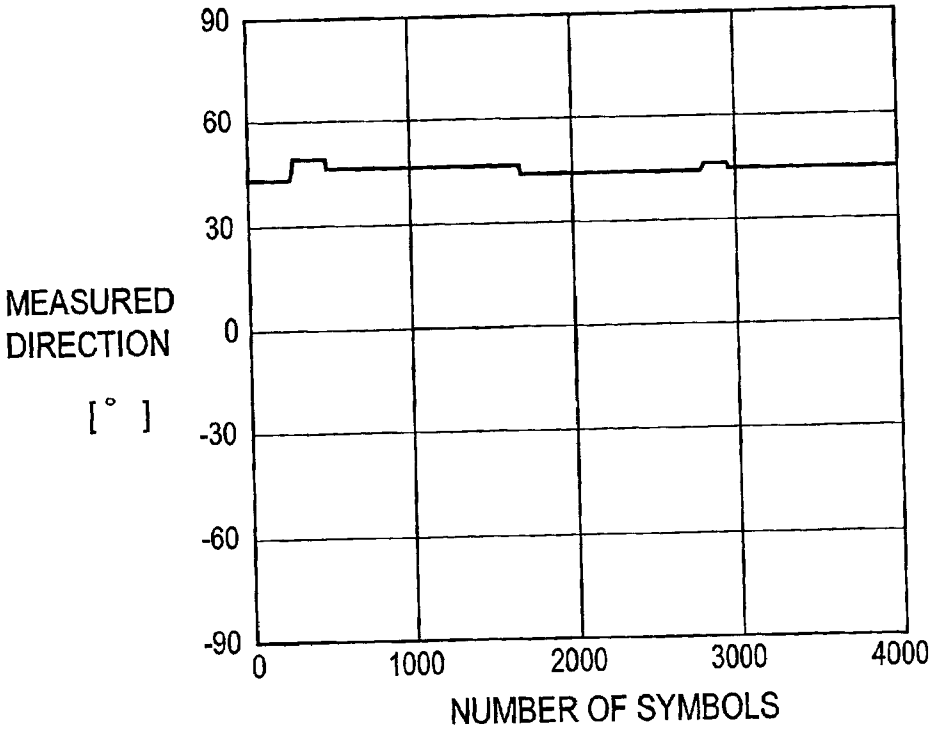
FIG. 23 graphically shows a result of experiments in which the reliable direction is determined to be the direction being measured.

By contrast, when the techniques illustrated in FIGS. 11, 14, 17 and 19 are used to determine and deliver a reliable measured direction, experiments conducted for received signals of the same conditions indicate a result as shown in FIG. 23 for each of these techniques where there is no rapid variation or there is no large error, and the actual arriving direction of 45° is obtained in a fairly stabilized manner. The experiments have been conducted with M=10 and N=8. It is seen from such result that the techniques illustrated in FIGS. 11, 14, 17 and 19 allow a stabilized measured direction to be obtained while reducing the probability that a mean measured direction which is obtained during a substantial depression in a received power is determined to be reliable, thus providing noise resistance as well as interference resistance.

In the above description, the measured direction which is retained in the output part 53 of direction measuring unit 23 is updated. However, rather than retaining the measured direction in the output part 53, information may be retained in the beam selection control circuit 24 and may be updated by an output from the output part 53.

Referring back to FIG. 5B, when the output from one of the receivers 15 and 22, for example, receiver 22, is inverted in polarity in a polarity inverter 231, as indicated in broken lines, the amount of control which must be applied to the variable phase shifter 201 can be reduced. The direction measuring unit 23 may determine the arriving angle on the basis of an output level of a phase difference between those received signals which is detected by an analog phase difference detection circuit. It is necessary to invert the polarity of one of the both received signals in order to achieve the response as shown in FIG. 5B in this instance. A phase difference between both received signals can be determined by converting each received signal into a complex digital signal and determining the phase of each received signal to derive a difference therebetween. It is to be note that the relationship between the phase difference and the arriving angle need not be as illustrated by the relationship shown in FIG. 5B. In other words, a phase difference between both received signals can be determined without inverting the polarity of one of the both received signals. In this instance, the phase difference θ is equal to 0 for the arriving angle of 0° in a direction of the perpendicular.

It is to be understood that despite the above description, the number of narrow angle beams is not limited to four, but any desired number of beams may be used. The function of the direction measuring unit 23 can be served by causing a computer to execute a program.

Figure 2:
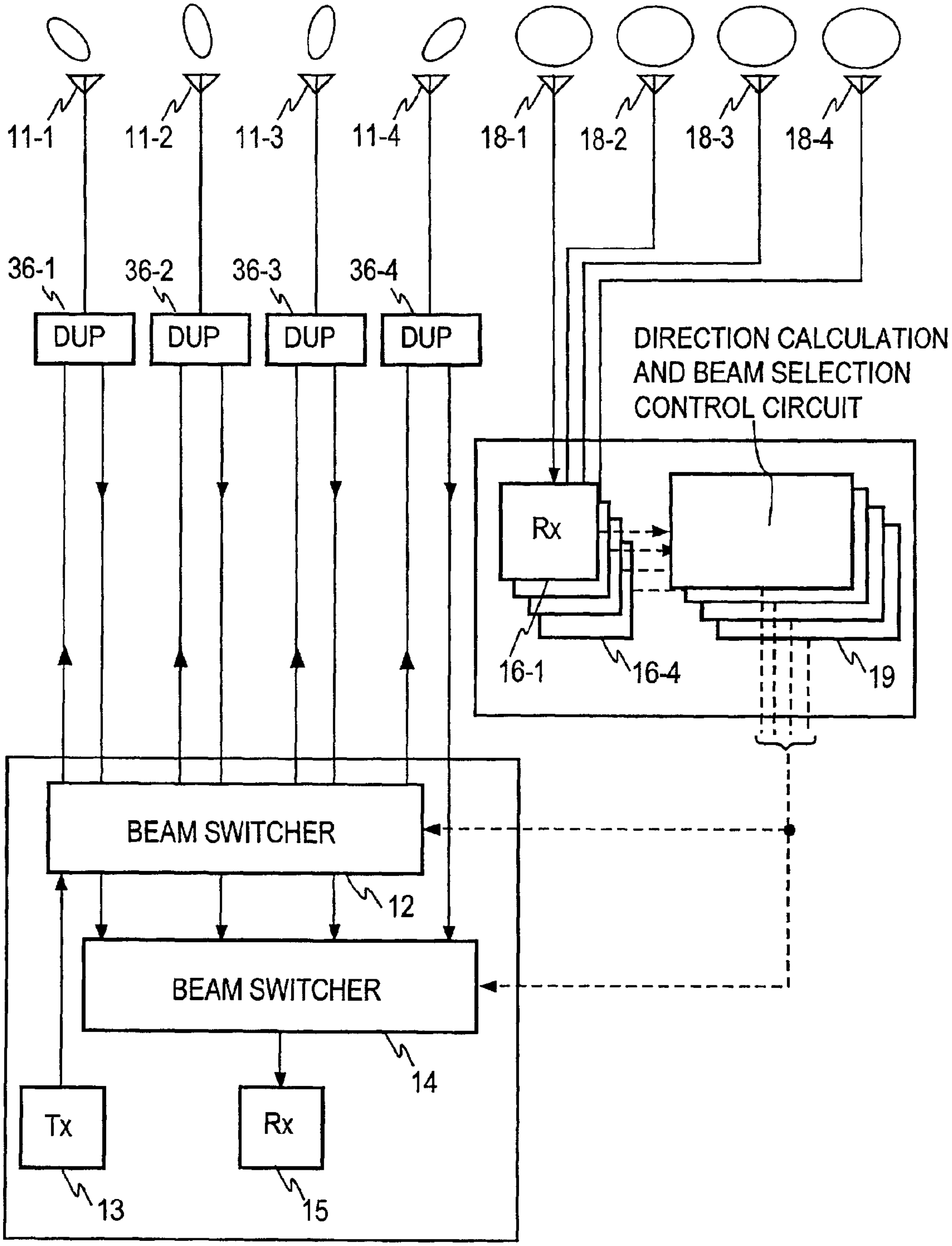
FIG. 2 PRIOR ART
FIG. 2 is a block diagram of another example of conventional mobile communication base station equipment.
Figure 3:
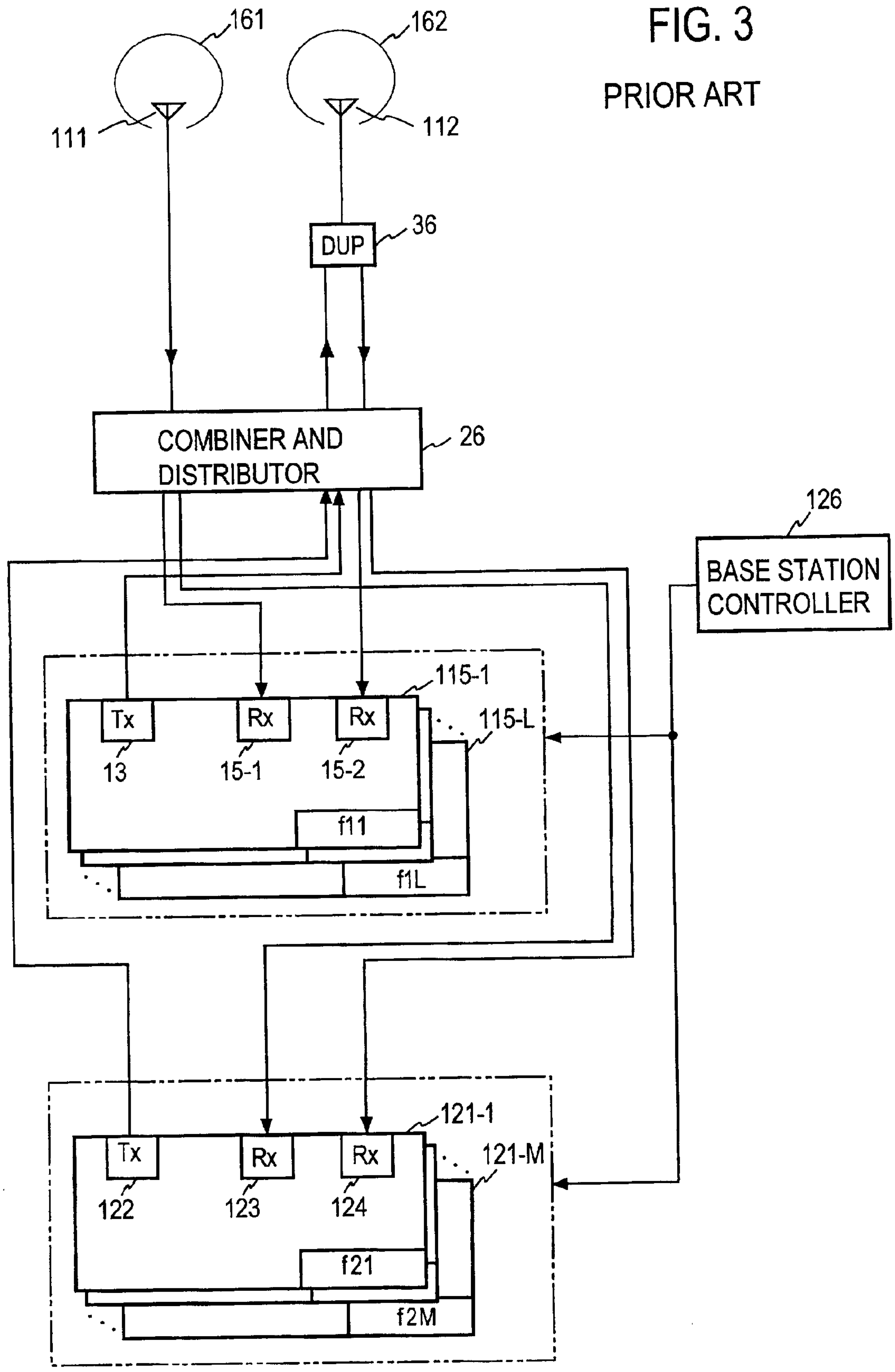
FIG. 3 PRIOR ART
FIG. 3 is a block diagram of a further example of conventional base station equipment.
Figure 4A:
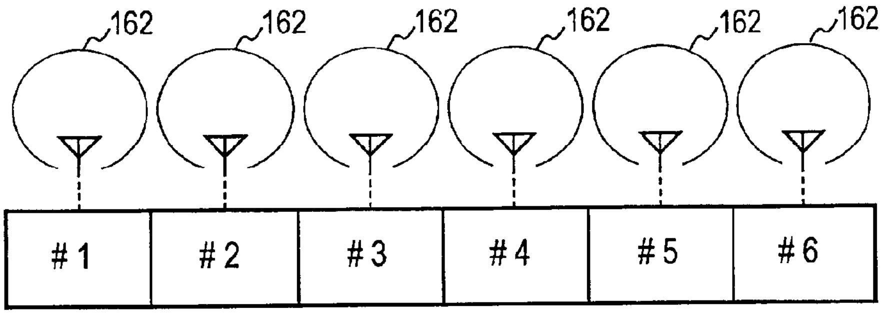
FIGS. 4A and 4B are diagrams illustrating relationships between time slots and antenna beams in a conventional base station equipment.
Figure 4B:
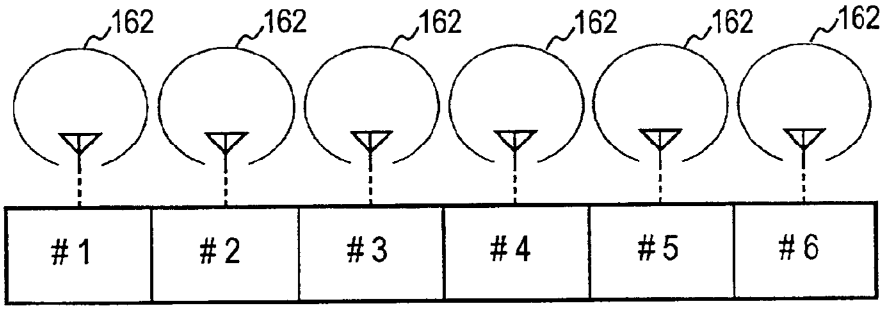

As discussed above, according to the first aspect of the present invention, one of received signals from a pair of received wide angle beams is fed to a communication receiver while the other is fed to a direction finder receiver. By measuring a phase difference between signals from these receivers, the arriving direction of the received radio wave is detected. By controlling a beam switcher so that an output from a transmitter is fed to one of a plurality of transmitting narrow angle beams, the transmitting power can be reduced (due to a high gain of the antenna) and the interference can be reduced (due to the narrow angle beam). In addition, the arriving direction of the radio wave can be detected by simple means of detecting a phase difference. Because the transmitting narrow angle beam is switched in accordance with a change in the arriving direction of a received signal from a mobile station, it is possible to allow the transmitting narrow angle beam to substantially track the direction of the mobile station. A single direction finder receiver is used for purpose of finding the arriving direction of a received radio wave while utilizing other communication receivers for the purpose of finding the direction. As a consequence, the entire arrangement is greatly simplified as compared with the prior art shown in FIG. 2. In particular, as shown in FIGS. 6 and 8, a single direction finder receiver can be used with transmitters/receivers for a plurality of communication channels.

When a reliable measured direction is determined, it is possible to direct a transmitting narrow angle beam always accurately without failure.

Figure 24:
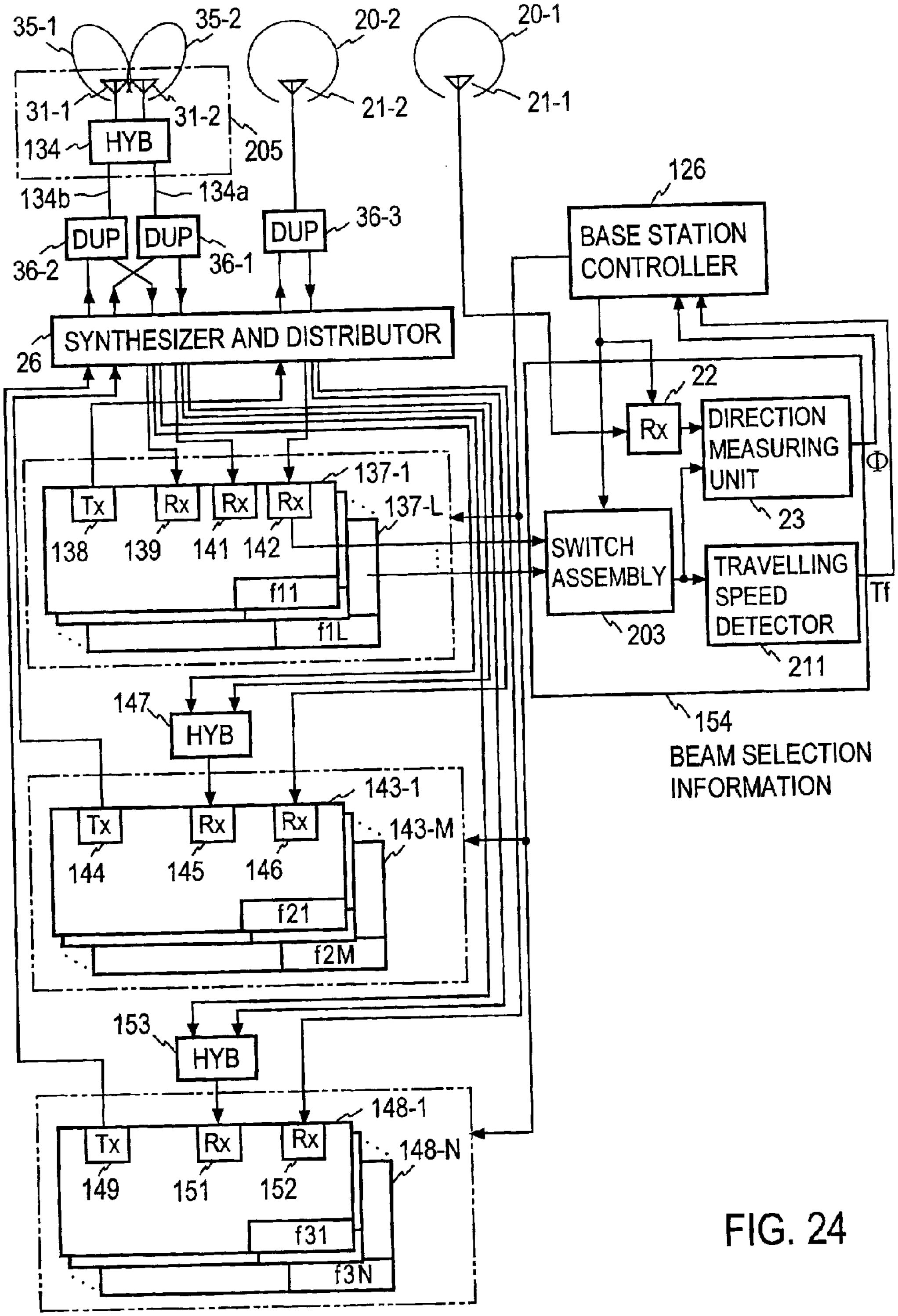
FIG. 24 is a block diagram of an embodiment according to the second aspect of the present invention.

FIG. 24 shows an embodiment according to a second aspect of the present invention. In this instance, a pair of 60° beam (narrow angle beam) forming antenna assemblies 205 cover a 120° sector service area and a 120° beam (wide angle beam) antenna 21-2 covers the 120° sector service area while a combination of antennas 31-1 and 31-2 of the narrow angle beam forming antennas assembly 205 and the antennas 21-2 enables a diversity reception. The antennas 31-1 and 31-2 are connected through a hybrid 134 and through duplexers 36-1 and 36-2 to a combiner and distributor 26 while the 120° beam antennas 21-2 is connected through a duplexer 36-3 to the combiner and distributor 26. As viewed toward the antennas 31-1 and 31-2 from ports 134*a* and 134*b* of the hybrid 134 where it is connected to the duplexers 36-1 and 36-2, respectively, each of the principle beams 35-1 and 35-2 of the combined directivity response has a beam width of 60° and are directed to the left and to the right, respectively, while the antenna 21-2 has a wide angle beam 20-2 having a beam width of 120°, substantially covering the narrow angle beams 35-1 and 35-2. In this manner, the combination of the antennas 31-1 and 31-2 and the hybrid 134 constitute the narrow angle beam forming assembly 205 which forms the pair of 60° beams (narrow angle beams) 35-1 and 35-2.

Each of transmitters/receivers 137-1 to 137-L for channels f1l to f1L inclusive of control and communication channels includes a transmitter 138 which can feed transmitting power directly to the 120° beam (wide angle beam) antenna 21-2 through the combiner and distributor 26 and the duplexer 36-3, receivers 139 and 141, each of which can be fed with a received signal from each 60° beam port of the hybrid 134 through the combiner and distributor 26 and the duplexers 36-2 or 36-1, and a receiver 142 which can be fed with a received signal from the 120° beam antenna 21-2 through the combiner and distributor 26 and the duplexer 36-3.

Each of the communication channel transmitters/receivers 143-1 to 143-L for channels f21 to f2M includes a receiver 144 which can feed a transmitting power to the 60° beam port 134*a* of the hybrid 134 through the combiner and distributor 26 and the duplexer 36-1, a receiver 145 which can be fed with a received signal from the both 60° beam ports 134*a* and 134*b* of the hybrid 134 through the hybrid 147, the combiner and distributor 26 and the duplexers 36-1 or 36-2, and a receiver 146 which can be fed with a received signal from the 120° beam antenna 21-2 through the combiner and distributor 26 and the duplexer 36-3.

Each of communication channel transmitters/receivers 148-1 to 148-M for channels f3l to f3M includes a transmitter 149 which can feed transmitting power to the 60° beam port 134*b* of the hybrid 134 through the combiner and distributor 26 and the duplexer 36-2, a receiver 151 which can be fed with a received signal from either 60° beam port 134*a* or 134*b* of the hybrid 134 through the combiner and distributor 26 and the duplexer 36-1 or 36-2, and a receiver 152 which can be fed with a received signal from the 120° beam antenna 21-2 through the combiner and distributor 26 and the duplexer 36-3.

Another wide angle beam antenna 21-1 which covers the service area in the similar manner as the wide angle beam antenna 21-2 is disposed close thereto within a distance of one-half the wavelength and is directed in the same beam direction. A received signal from the antenna 21-1 is received by a receiver 22.

A received output from a control channel receiver 142 is fed to a beam selection information detection system 154, which obtains direction information Φ as both received signals from the receiver 142 and the receiver 22 are fed to a direction measuring unit 23 which is responsive thereto to determine whether the direction on which a mobile station, which provided the received signals, is located in the direction of the 60° beam 35-1 or in the direction of the 60° beam 35-2, and also obtains information Tf representing the traveling speed of the mobile station which is derived by a traveling speed detector 211 on the basis of a variation in the reception level of the receiver 142 or fading pitch Tf. It is to be noted that any one of various direction measuring units mentioned above can be used for the direction measuring unit 23 of this embodiment. As described above in connection with the embodiment of FIG. 6, a base station controller 126 controls a switch assembly 203 so that the received signal from the receiver 142 of one of the transmitters/receivers 137-1 to 137-L be fed to the direction measuring unit 23 and the traveling speed detector 211, and also controls the receiver 22 to establish a channel therein.

Figure 25A:
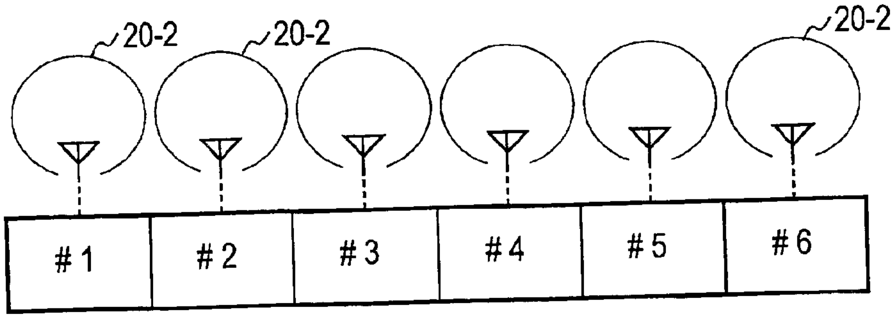
FIG. 25A shows examples of time slots of control and communication channel transmitters/receivers and prevailing antenna directivity responses which occur in the embodiment shown in FIG. 24.
Figure 25B:
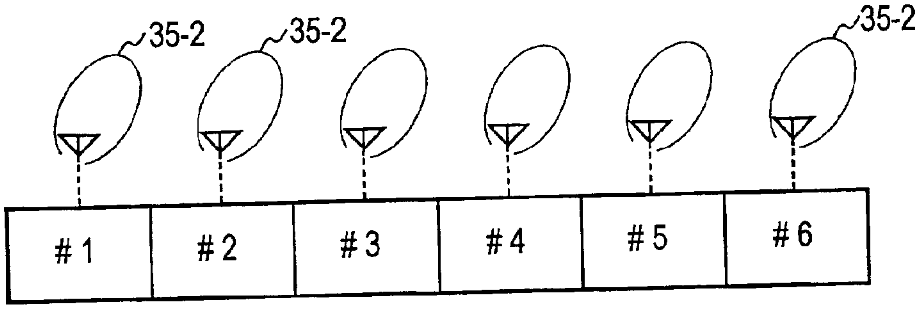
FIGS. 25B and C show two examples of time slots of communication channel transmitters/receivers and prevailing antenna directivity responses which occur in the embodiment shown in FIG. 24.
Figure 25C:
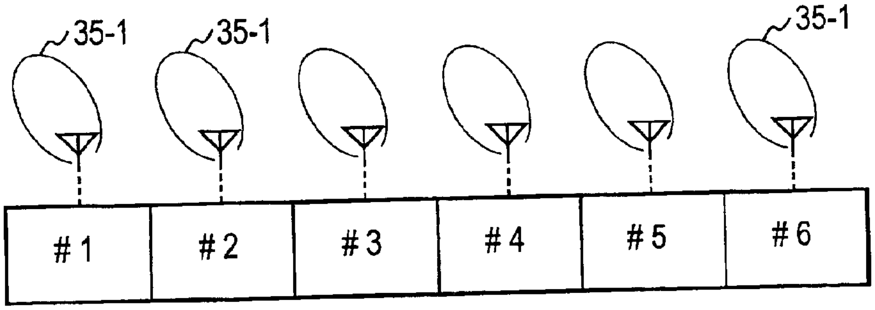

The total time slots of the 120° beam control and communication channel transmitters/receivers 137-1 to 137-L are in the 120° beam (wide angle beam) 20-2, as shown in FIG. 25A. The time slots of the 60° beam communication channel transmitters/receivers 143-1 to 143-M are assigned to the right beam (narrow angle beam) 35-2 as shown in FIG. 25B while time slots of the 60° beam communication channel transmitters/receivers 148-1 to 148-N are assigned to the left beam (narrow angle beam) 35-1 as shown in FIG. 25C. The operation will now be described.

Figure 26A:
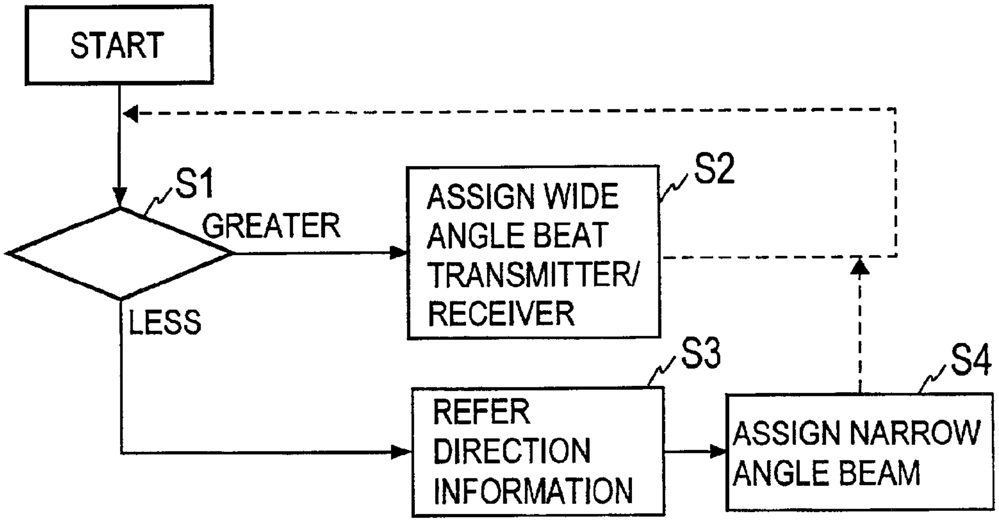
FIG. 26A is an illustration of a procedure of determining the traveling speed caused by a fading pitch of a mobile station and selecting a particular beam.

The base station controller 126 interrogates the beam selection information detection system 154 for the traveling speed information (fading pitch Tf) and beam (direction) information ϕ when it assigns a communication channel as during a call request or termination. In response to the response information Tf and Φ, the base station controller 126 operates in a manner shown in FIG. 26A. If Tf is greater than a given value, it is determined that a mobile station is in the course of rapidly traveling and thus one of the transmitters/receivers 137-1 to 137-L having a communication channel in the 120° beam (wide angle beam) is assigned for the intended communication (S2). On the other hand, if it is found at step S1 that Tf is less than the given value, it is determined that the mobile station remains stationary or is moving slowly, and a reference is made to the direction information ϕ (S3) and one from either the transmitters/ receivers 143-1 to 143-M or 148-1 to 148-N having a communication channel in the 60° beam (narrow angle beam) which includes the referred direction in its service area is assigned (S4). Because the transmitters/receivers 143-1 to 143-M or 148-1 to 148-N are assigned to a communication with a mobile station, for which the traveling speed is determined to be slow, the probability that a channel switching operation occurs during the communication with this mobile station is low. Accordingly, the beam selection information detection system 154 is not connected to the transmitters/receivers 143-1 to 143-M or 148-1 to 148-N. However, as indicated by broken lines in FIG. 26A, the beam selection information detection system 154 may be connected to the transmitters/receivers 143-1 to 143-M and 148-1 to 148-N so that subsequent to the completion of the steps S2 and S4, the operation may return to step S1 where the traveling speed may be detected to switch between a wide angle beam transmitter/receiver and a narrow angle beam transmitter/receiver in an adaptive manner.

Figure 26B:
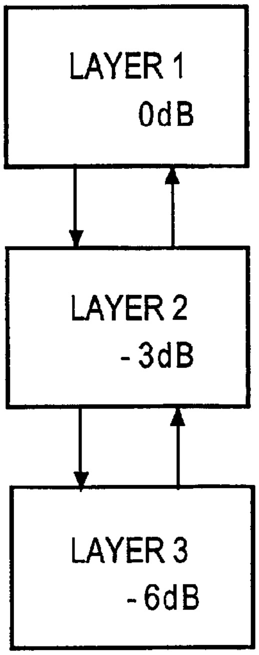
FIG. 26B illustrates an exemplary relationship between an antenna beam width (layer) and transmitted power.

It is possible to suppress the beam division loss to the lowest possible limit by adaptively choosing the relative proportions of the numbers of the transmitters/receivers 137-1 to 137-L, 143-1 to 143-M and 148-1 to 148-N depending on the traffic and the distribution of the traveling speeds. In the present embodiment, the transmitting beam comprises a 120° beam and a pair of 60° beams, but it is also possible to use a 120° beam and a pair of 60°beams for the receiving beam in the similar manner as for the transmitting beam. It will be noted that in FIG. 24, the hybrids 147 and 153 are used to form a 120° beam for reception. The transmitters/receivers 143-1 to 143-M and 148-1 to 148-N which use 60° beam are capable of transmitting with a high gain antenna, and accordingly use a transmitting power which is 3 dB lower than the transmitting power used with the 120° beam transmitters/receivers 137-1 to 137-L. As shown in FIG. 26B, the transmitting power can be reduced by increasing the layers used such as a coverage of the service area by the 120° beam (layer 1), a coverage of the service area by the pair of 60° beams and a coverage of the service area by narrower beams such as four 30° beams (layer 3). In the arrangement of FIG. 26B, the transmitting power may choose 0 dB for the layer 1, −3 dB for the layer 2 and −6dB for the layer 3.

Figure 27:
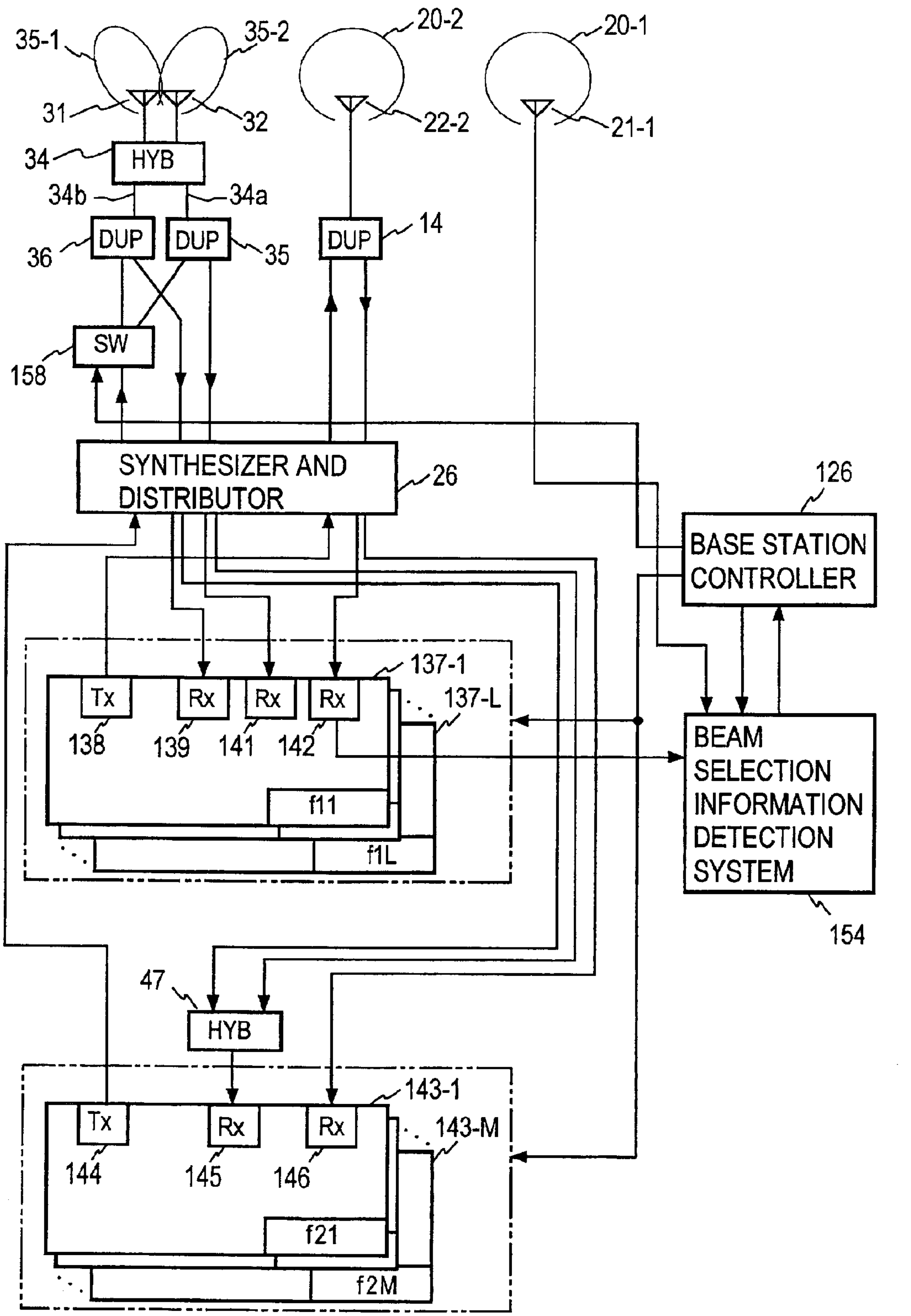
FIG. 27 is a schematic view of another embodiment according to the second aspect of the present invention in which a narrow angle beam communication channel transmitter/receiver is connected to a narrow angle beam antenna during a time slot which is assigned depending on the direction of a mobile station.

As an alternative, one of 60° communication channel transmitters/receivers shown in FIG. 24, namely, 148-1 to 148-N, may be omitted and the transmitter 144 of the remaining 60° communication channel transmitters/receivers 143-1 to 143-M may feed a transmitting power to the 60° beam ports 134*a* and 134*b* in a switched manner. Such an arrangement is shown in FIG. 27. Each transmitter 144 can be switchably connected to the 60° beam ports 134*a* and 134*b* through a switch 158 and through the combiner and distributor 26.

Figure 28A:
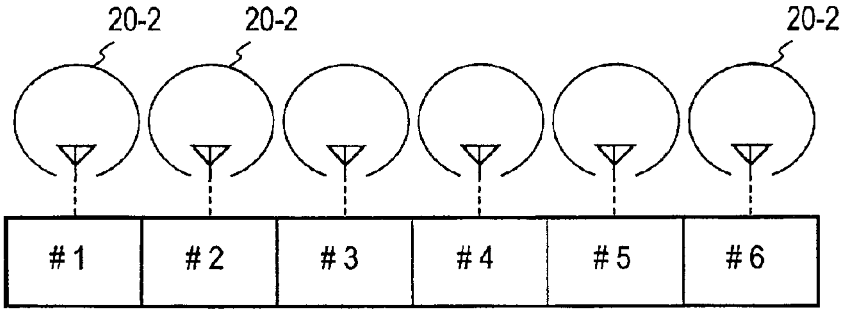
FIG. 28A is a schematic view showing an exemplary relationship between time slots for control and communication channel transmitters/receivers and prevailing antenna beams which occur in the embodiment shown in FIG. 27.
Figure 28B:
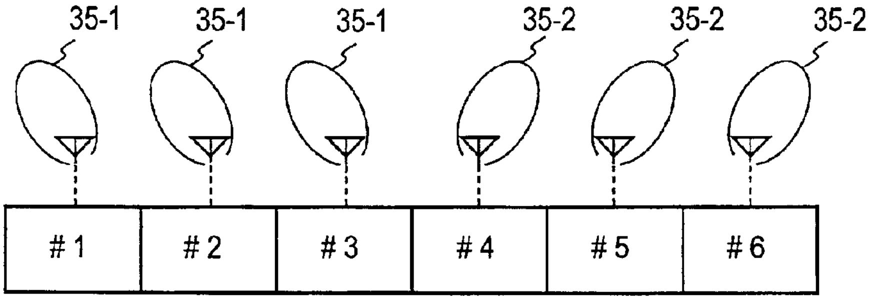
FIG. 28B is a schematic illustration of another relationship between time slots of communication channel transmitters/receivers and prevailing antenna beams which occur in the embodiment shown in FIG. 27.

The total time slots of 120° beam control and communication channel transmitters/receivers 137-1 to 137-L are in the 120° beam 20-2, as shown in FIG. 28A while the time slots of the 60° communication channel transmitters/receivers 143-1 to 143-M are assigned to the left beam 35-1 for the first three slots and assigned to the right beam 35-2 for the second three slots, as shown in FIG. 28B. Its operation will be described below.

A base station controller 126 interrogates a beam selection information detection system 154 for the traveling speed information (fading pitch Tf) and the direction information Φ when assigning a communication channel as during a call request or termination. In response to such information, if Tf is greater than the given value, the base station controller 126 determines that a mobile station is rapidly traveling, and accordingly, assigns one of the transmitters/receivers 137-1 to 137-L having a communication channel in the 120° beam. On the other hand, if Tf is less than the given value, the controller determines that the mobile station remains stationary or slowly traveling, and thus assigns one of the transmitters/receivers 143-1 to 143-M having a 60° beam communication channel. During the process, the direction on which the mobile station is located is detected on the basis of a phase difference between received signals from the receiver 142 and the antenna 21-1, and a selection of either the right beam 35-2 or the left beam 35-1 is determined in accordance with such Φ information, and a corresponding time slot is assigned to this communication. The base station controller 126 switches a beam changing switch 158 in synchronism with the beam switching timing of the time slot. Because the transmitters/receivers 143-1 to 143-M are assigned only to a mobile station which has been determined to be traveling with a slow speed, the possibility that a channel switching operation occurs during the communication is low, and thus, the beam selection information detection system 154 is not connected to the transmitters/receivers 143-1 to 143-M.

Any one of the arrangements described above with reference to FIGS. 5B and 9 to 20 may be used as the direction measuring unit 23 used within the beam selection information detection system 154 shown in FIG. 24.

Figure 29:
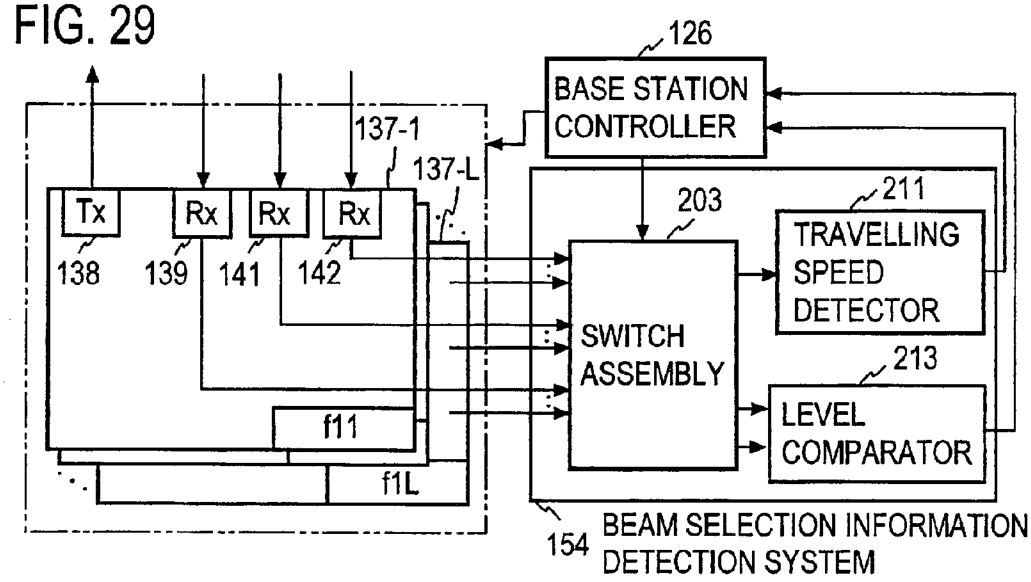
FIG. 29 is a schematic view showing another specific example of a beam selection information detector unit 154 shown in FIG. 24.

In the embodiments shown in FIGS. 24 and 27, the antenna 21-1 and the receiver 22 may be omitted, and a level comparator 213 shown in FIG. 29 may be used in place of the direction measuring unit 23 in the beam selection information detection system 154, thus determining the narrow angle beam which is directed on the direction on which a mobile station transmitting the received radio wave is located. Received signals from the receivers 139, 141 and 142 in the 120° beam control and communication channel transmitters/receivers 137-1 to 137-L are fed to the beam selection information detection system 154 including a switch assembly 203 where the received signal from the receivers 139, 141 and 142 of one of the transmitters/receivers 137-1 to 137-L are selected. Received signals from the receivers 139 and 141 are fed to the level comparator 213 where the levels of the both received signals are compared against each other. If the received signal level of the receiver 139 is greater than the received signal level from the receiver 141, it is determined that the mobile station is located in the service area of the narrow angle beam 35-2. On the contrary, if the received signal level from the receiver 141 is higher, it is determined that the mobile station is located in the service area of the narrow angle beam 35-1. Beam (direction) information indicating the narrow angle beam thus determined is delivered. In the event the traveling speed information of the mobile station remains below a given value, the base station controller 126 assigns one of the communication channel transmitters/receivers including a communication channel transmitter which feeds a transmitting power to the narrow angle beam which has been determined by the level comparator 213. When this technique is applied to the embodiment shown in FIG. 24, if the beam information indicated by the beam selection information detection system 154 indicates the narrow angle beam 35-1, one of the communication transmitters/receivers 143-1 to 143-M is assigned, and if the beam information indicates the narrow angle beam 35-2, one of the communication transmitters 148-1 to 148-N is assigned. When the beam selection information detection system 154 shown in FIG. 29 is used in the embodiment of FIG. 27, the base station controller 126 assigns one of the communication channel transmitters/receivers 143-1 to 143-M if the traveling speed is equal to or less than a given value, and assigns a time slot to the communication which is chosen in accordance with the relationship between the time slot and the narrow angle beam shown in FIG. 28B depending on the beam information from the level comparator 213, namely, whether it indicates the right beam 35-2 or the left beam 35-1.

Figure 30:
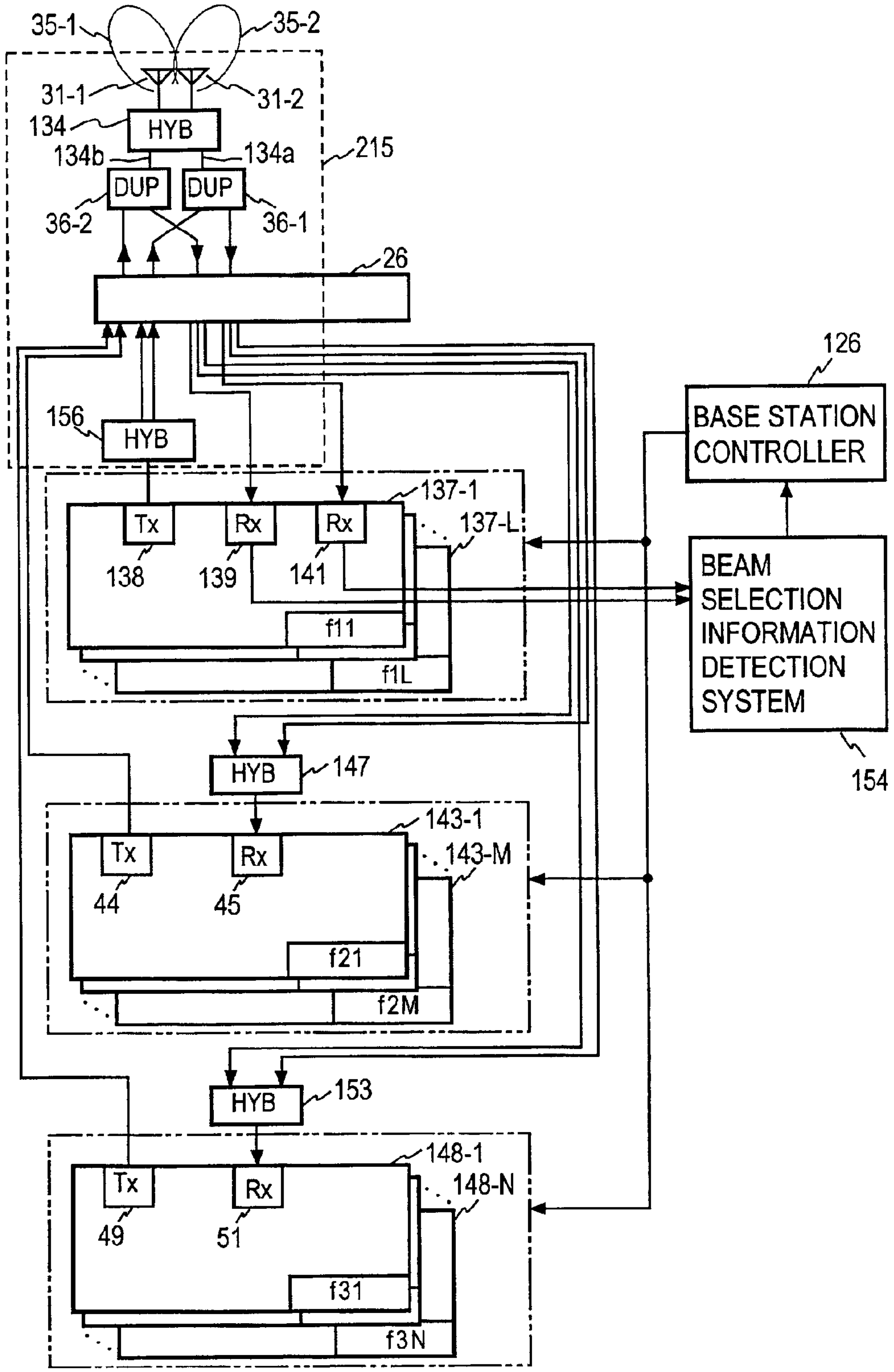
FIG. 30 is a schematic view of an embodiment which results when the diversity function is removed from the embodiment shown in FIG. 24.

One embodiment which uses the beam selection information detection system 154 shown in FIG. 29, but in which the diversity arrangement is removed from the arrangement shown in FIG. 24 is shown in FIG. 30 where corresponding parts to those described before are designated by like reference characters. Specifically, in this embodiment, the 120° beam antennas 21-1 and 21-2, the duplexer 36-3 and the receivers 22, 142, 146 and 152 are omitted from the arrangement of FIG. 24. Each transmitter 38 in the 120° beam control and communication channel transmitters/receivers 137-1 to 137-L is capable of feeding a transmitting power to the both 60° beam ports 134*a* and 134*b* of the hybrid 134 through a hybrid 156, and through the combiner and distributor 26 and the duplexers 36-1 and 36-2, thus feeding transmitting power to the 120° beam (wide angle beam) antenna assembly 215. In other words, in addition to feeding transmitting power to (and receiving received signals from) a plurality of narrow angle beams 35-1 and 35-2, a plurality of narrow angle beam antennas 31-1 and 31-2 may be used to perform the transmission and the reception through a single wide angle beam.

In the arrangement shown in FIG. 27 also, the 120° beam antenna 21-1 and 21-2 may be omitted, and the beam selection information detection system 154 shown in FIG. 29 may be used to cause the pair of 60° beam antenna 31-1 and 31-2 to serve as the 120° beam antennas, in the similar manner as shown in FIG. 30.

The wide angle beam is not limited to 120° as described above, but may cover 360°, for example. Instead of covering a service area which is covered by a wide angle beam by a pair of narrow angle beams, three or more narrow angle beams may be used to cover the service area of the wide angle beam.

According to the second aspect of the present invention as described above, a narrow angle beam can be assigned to a mobile station which is traveling slowly, without irradiating unnecessary radio waves in directions other than the direction on which a desired mobile station is located. The transmitting power from the base station equipment can be reduced in a corresponding manner, and the interferences can also be reduced because a dispersion of radio waves can be suppressed.

What is claimed is:

1. A mobile communication base station equipment comprising a wide angle beam forming antenna assembly which forms a pair of wide angle beams located close to each other and directed in a common direction;

a narrow angle beam forming antenna assembly for forming a plurality of narrow angle beams having directivity responses which are directed in different directions and collectively covering the wide angle beam;

a communication transmitter;

a beam switcher connected between the communication transmitter and the narrow angle beam antenna assembly for selectively feeding transmitting power from the communication transmitter to the plurality of narrow angle beams;

a communication receiver connected to the wide angle beam forming antenna assembly and fed with a received signal from one of the pair of wide angle beams formed by the wide angle beam forming antenna assembly;

a direction finder receiver connected to the wide angle beam forming antenna assembly and fed with a received signal from the other wide angle beam of the pair from the wide angle beam forming assembly;

a direction measuring unit for measuring a direction on which a mobile station transmitting the received signal is located from a phase difference between the both received signals from the communication receiver and the direction finder receiver;

and a beam selection control circuit connected to the direction measuring unit and the beam switcher for controlling the beam switcher by feeding an output from the transmitter to one of the plurality of narrow angle beams in accordance with the measured direction.

2. A mobile communication base station equipment according to claim 1 in which there are provided N sets (where N is an integer equal to or greater than 2) of said beam switcher, said communication transmitter and said communication receivers, further comprising a combiner and distributor for combining outputs from the communication transmitters which are fed from said N beam switchers in a manner corresponding to each of the narrow angle beams and for distributing the received signals which are to be fed from the wide angle beam forming antenna assembly to the communication receivers among said N communication receivers;

and a switch assembly for feeding the received signals from said N communication receivers to the direction measuring unit in a time division manner;

said beam selection control circuit being operative to control one of the beam switchers which forms a pair with the communication receiver which is used to determine the measured direction.

3. A mobile communication base station equipment according to claim 1 in which the narrow angle beam forming antenna assembly comprises a plurality of narrow angle beam antennae each forming a narrow angle beam, and the wide angle beam forming antenna assembly comprises a pair of wide angle beam antenna each forming said wide angle beam.

4. A mobile communication base station equipment according to claim 1 in which the narrow angle beam forming antenna assembly comprises a multi-beam antenna including an array antenna having a spacing on the order of one-half the wavelength and a beam former to define the plurality of narrow angle beams, and the wide angle beam forming antenna assembly comprises the multi-beam antenna, and a beam demultiplexer which demultiplexes a signal received by the multi-beam antenna in the plurality of narrow angle beams into two received signals, each of which has the directivity response of each of two elements in the array antenna.

5. A mobile communication base station equipment according to claim 1 in which the direction measuring unit comprises a direction measuring assembly for measuring a phase difference between the both received signals to measure a direction, a reliability presence/absence decision unit for determining the presence or absence of a reliability in the measured direction, and an output part for delivering the measured direction which has been determined to be reliable by the reliability presence/absence decision unit.

6. A mobile communication base station equipment according to claim 5 in which the reliability presence/absence decision unit comprises a magnitude measuring unit for measuring the magnitude of at least one of the both received signals, a memory for storing the measured direction and the measured magnitude, and a maximum value detector for detecting a maximum one of a plurality of latest values of the measured magnitude to determine that the measured direction which is obtained when the detected maximum magnitude is measured as reliable.

7. A mobile communication base station equipment according to claim 5 in which the reliability presence/absence decision unit comprises a magnitude measuring unit for measuring the magnitude of at least one of the received signals, and a comparator for determining whether or not the measured magnitude exceeds a threshold value and in the event the measured magnitude is determined to have exceeded the threshold value, determining the measured direction as reliable.

8. A mobile communication base station equipment according to claim 5 in which the reliability presence/absence decision unit comprises a difference circuit for determining a difference between a current measured direction and a previous measured direction, and a comparator for determining whether or not the difference has exceeded a threshold value and in the event it is determined that the difference is equal to or less than the threshold value, determining the current measured direction as reliable.

9. A mobile communication base station equipment according to claim 5 in which the reliability presence/absence decision circuit comprises a memory for storing the measured direction, a difference circuit for determining a difference between adjacent measured directions in a time sequence of measured directions stored in the memory inclusive of a latest measured direction, and a minimum value detector for detecting a minimum one of the differences and determining one of the two measured directions which are used in detecting the minimum difference as reliable.

10. A mobile communication base station equipment according to claim 5 in which the direction measuring unit comprises a measuring unit for measuring an instantaneous phase difference between both concurrent received signals a plurality of times, and an averager for determining a mean measured direction corresponding to the plurality of values of the instantaneous phase difference and providing it as the measured direction.

11. A mobile communication base station equipment according to claim 6 in which the magnitude measuring unit comprises an instantaneous magnitude measuring unit for measuring an instantaneous magnitude of concurrent received signals a plurality of times, and an averager for averaging the plurality of values of the instantaneous magnitude to provide the measured magnitude.

12. A mobile communication base station equipment comprising a wide angle beam forming antenna assembly for forming a wide angle beam;

a narrow angle beam forming antenna assembly for forming a plurality of narrow angle beams having directivity responses which are directed in different directions and collectively covering the wide angle beam;

a plurality of wide angle beam communication channel transmitters/receivers capable of feeding the wide angle beam forming antenna assembly;

a plurality of narrow angle beam communication channel transmitters/receivers capable of feeding each narrow angle beam of the narrow angle beam forming antenna assembly;

a beam selection information detection system for detecting a traveling speed of a mobile station and for detecting which one of the narrow angle beams represents a direction on which the mobile station is located;

and a base station controller for selectively assigning one from the wide angle beam communication channel transmitters/receivers or the narrow angle beam communication transmitters/receivers for a communication with the mobile station on the basis of the detected traveling speed and the detected direction of the mobile station.

13. A mobile communication base station equipment according to claim 12 in which the base station equipment is of a time division multiple access communication system, the base station controller including a switch assembly which switches the narrow angle beam of the narrow angle beam communication channel transmitters/receivers in accordance with a time slot of the time division communication system, the base station controller assigning a time slot which corresponds to the direction of the mobile station when assigning one of the narrow angle beam communication channel transmitters/receivers.

14. A mobile communication base station equipment according to claim 12, further comprising a direction finder antenna for forming a wide angle beam of the same configuration as the first mentioned wide angle beam and oriented in the same direction and located close thereto;

and a direction finder receiver connected to the direction finder antenna;

the beam selection information detection system comprising a traveling speed detector which is fed with a received signal from the wide angle beam for detecting information representing a traveling speed of a mobile station which is transmitting the received signal, and a direction measuring unit which is fed with a received signal from the wide angle beam and a received signal from the direction finder receiver to measure the direction on which the mobile station is located from a phase difference between the both received signals.

15. A mobile communication base station equipment according to claim 14 in which the direction measuring unit comprises a reliability presence/absence decision unit for determining the presence or absence of a reliability in the measured direction and for delivering the measured direction which is determined to be reliable.

16. A mobile communication base station equipment according to claim 12 in which the beam selection information detection system comprises a traveling speed detector which is fed with a received signal from the wide angle beam for detecting information representing a traveling speed of a mobile station which is transmitting the received signal, and a level comparator which is fed with received signals from the plurality of narrow angle beams for determining a direction indicated by the directivity of the narrow angle beam which produced a maximum reception level as the direction on which the mobile station is located.

17. A mobile communication base station equipment according to claim 12, further comprising a combiner for forming the plurality of narrow angle beams into the wide angle beam, whereby the narrow angle beam forming antenna assembly also serves as the wide angle beam forming antenna assembly.

* * * * *